(12) United States Patent
Marshall et al.

(10) Patent No.: US 12,479,570 B2
(45) Date of Patent: Nov. 25, 2025

(54) ROTOR ASSEMBLY

(71) Applicant: Supernal, LLC, Washington, DC (US)

(72) Inventors: Bryan Marshall, Georgetown, TX (US); Eric Loos, Glastonbury, CT (US)

(73) Assignee: Supernal LLC, Irvine, CA (US)

( * ) Notice: Subject to any disclaimer, the term of this patent is extended or adjusted under 35 U.S.C. 154(b) by 0 days.

(21) Appl. No.: 18/305,283

(22) Filed: Apr. 21, 2023

(65) Prior Publication Data

US 2023/0339601 A1  Oct. 26, 2023

Related U.S. Application Data

(60) Provisional application No. 63/334,396, filed on Apr. 25, 2022, provisional application No. 63/333,679, filed on Apr. 22, 2022.

(51) Int. Cl.
*B64C 11/06* (2006.01)
*B64C 11/32* (2006.01)
(Continued)

(52) U.S. Cl.
CPC .............. *B64C 11/06* (2013.01); *B64C 11/32* (2013.01); *B64C 11/325* (2013.01); *B64C 11/38* (2013.01);
(Continued)

(58) Field of Classification Search
CPC ......... B64C 27/41; B64C 27/43; B64C 27/48; B64C 27/605; B64C 27/52;
(Continued)

(56) References Cited

U.S. PATENT DOCUMENTS 1,497,302 A  6/1924 Martin
2,648,387 A * 8/1953 Doman .................. B64C 27/41
416/114

(Continued)

FOREIGN PATENT DOCUMENTS

CA  2874341 A1  2/2014
EP  1705114 A1 * 9/2006
(Continued)

OTHER PUBLICATIONS

International Search Report and Written Opinion issued on Aug. 3, 2023 in counterpart International Patent Application No. PCT/US2023/019489 (14 pages, in English).

*Primary Examiner* — Christopher Verdier
(74) *Attorney, Agent, or Firm* — Bookoff McAndrews, PLLC

(57) ABSTRACT

A rotor assembly includes a hub assembly and a shaft assembly. The hub assembly includes a hub and a first coupling, and the shaft assembly may be coupled to the hub assembly with a second coupling. The second coupling may be configured to facilitate rotation of the hub relative to a shaft of the shaft assembly. A rotor blade may be coupled to the hub assembly with a third coupling and be configured to rotate with the shaft. The first coupling may be configured to couple the hub to an actuator and transmit movements of the actuator to the hub to facilitate cyclic pitch control of the rotor blade. The rotor shaft may include arms and the hub may include a body coupled to the rotor blade by the third coupling and pairs of extensions that extend from a surface of the body to receive the arms.

19 Claims, 13 Drawing Sheets

(51) Int. Cl.
   *B64C 11/38*   (2006.01)
   *B64C 27/02*   (2006.01)
   *B64C 27/41*   (2006.01)
   *B64C 27/43*   (2006.01)
   *B64C 27/48*   (2006.01)
   *B64C 27/52*   (2006.01)
   *B64C 27/605*  (2006.01)
   *B64C 29/00*   (2006.01)
   *B64C 29/02*   (2006.01)

(52) U.S. Cl.
   CPC ............ *B64C 27/021* (2013.01); *B64C 27/41* (2013.01); *B64C 27/43* (2013.01); *B64C 27/48* (2013.01); *B64C 27/52* (2013.01); *B64C 27/605* (2013.01); *B64C 29/0033* (2013.01); *B64C 29/02* (2013.01)

(58) Field of Classification Search
   CPC ..... B64C 29/0033; B64C 11/02; B64C 11/06; B64C 11/30; B64C 11/32; B64C 11/325; B64C 11/04; B64C 27/021; B64C 27/32
   See application file for complete search history.

(56) References Cited

U.S. PATENT DOCUMENTS

| | | | |
|---|---|---|---|
| 3,132,697 A | | 5/1964 | Cheesman et al. |
| 3,602,059 A | | 8/1971 | Jupe |
| 4,073,600 A | * | 2/1978 | Doman ............... B64C 27/41 |
| | | | 416/140 |
| 4,669,958 A | | 6/1987 | Peyran et al. |
| 4,688,993 A | * | 8/1987 | Ferris ............... B64C 27/605 |
| | | | 416/114 |
| 4,979,698 A | | 12/1990 | Lederman |
| 5,879,131 A | | 3/1999 | Arlton et al. |
| 6,467,724 B2 | * | 10/2002 | Kuenkler ............. B64C 11/02 |
| | | | 244/26 |
| 8,342,440 B2 | | 1/2013 | Papanikolopoulos et al. |
| 8,720,814 B2 | | 5/2014 | Smith |
| 9,284,058 B2 | | 3/2016 | Wang |
| 10,046,855 B2 | | 8/2018 | Bevirt et al. |
| 10,556,679 B2 | | 2/2020 | Petrov |
| 10,737,797 B2 | | 8/2020 | Murrow et al. |
| 10,926,654 B1 | | 2/2021 | Thrun et al. |
| 10,974,826 B2 | | 4/2021 | Karem et al. |
| 10,988,249 B1 | | 4/2021 | Sinha et al. |
| 11,001,374 B2 | | 5/2021 | Kawiecki |
| 11,066,162 B2 | | 7/2021 | Sinha et al. |
| 11,077,937 B1 | | 8/2021 | Bruell et al. |
| 11,203,423 B2 | | 12/2021 | Karem et al. |
| 11,208,203 B2 | | 12/2021 | Parks et al. |
| 11,273,911 B2 | | 3/2022 | Brand et al. |
| 11,299,287 B1 | | 4/2022 | Moy et al. |
| 11,312,491 B2 | | 4/2022 | Morris et al. |
| 11,320,841 B2 | | 5/2022 | McCullough et al. |
| 11,353,890 B1 | | 6/2022 | Auerbach et al. |
| 11,407,510 B2 | | 8/2022 | Mikic et al. |
| 2020/0108919 A1 | | 4/2020 | Sada et al. |
| 2020/0231277 A1 | | 7/2020 | Moore |
| 2020/0331602 A1 | | 10/2020 | Mikic et al. |
| 2021/0064062 A1 | | 3/2021 | Katayama et al. |
| 2021/0300194 A1 | | 9/2021 | Thrun et al. |
| 2021/0300541 A1 | | 9/2021 | Sinha et al. |
| 2021/0347472 A1 | | 11/2021 | Karem et al. |
| 2021/0347473 A1 | | 11/2021 | Dietrich et al. |
| 2021/0362852 A1 | | 11/2021 | McCullough et al. |
| 2021/0362857 A1 | | 11/2021 | McCullough et al. |
| 2022/0009626 A1 | | 1/2022 | Baharav et al. |
| 2022/0089279 A1 | | 3/2022 | Rosen |
| 2022/0126996 A1 | | 4/2022 | Long |
| 2022/0135217 A1 | | 5/2022 | Wittmaak, Jr. et al. |
| 2022/0169375 A1 | | 6/2022 | Ouellet et al. |
| 2022/0177124 A1 | | 6/2022 | Marshall et al. |
| 2022/0177145 A1 | | 6/2022 | Melack |

FOREIGN PATENT DOCUMENTS

| | | |
|---|---|---|
| EP | 3405390 B1 | 4/2020 |
| EP | 3670341 A1 | 6/2020 |
| WO | 2020250029 A1 | 12/2020 |
| WO | 2021140804 A1 | 7/2021 |
| WO | 2022074405 A1 | 4/2022 |

* cited by examiner

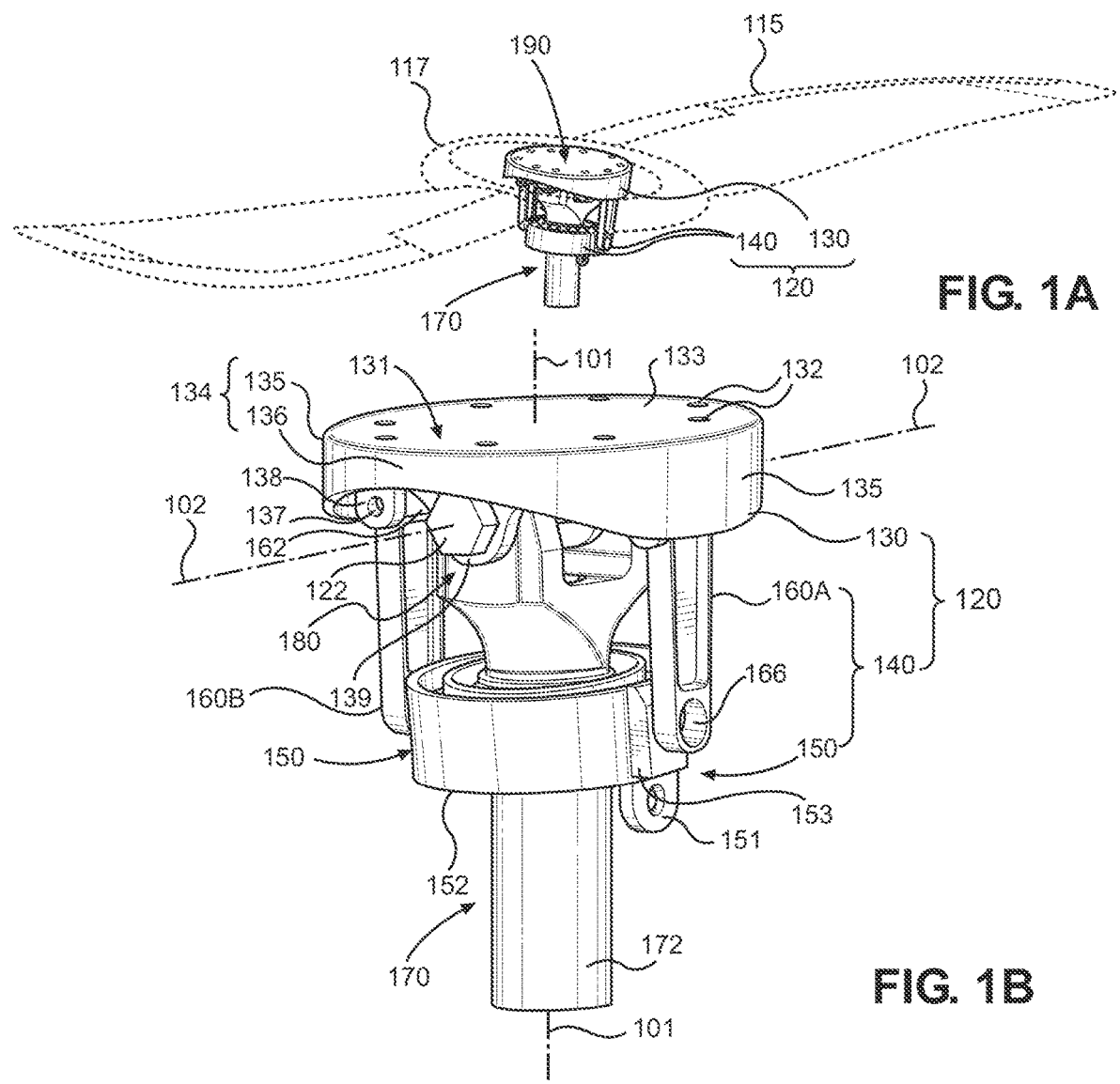
FIG. 1A
FIG. 1B
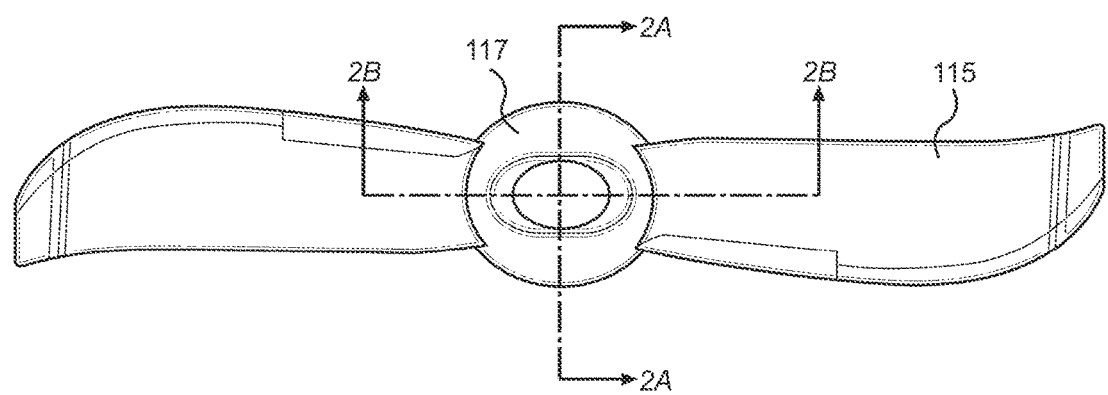
FIG. 1C

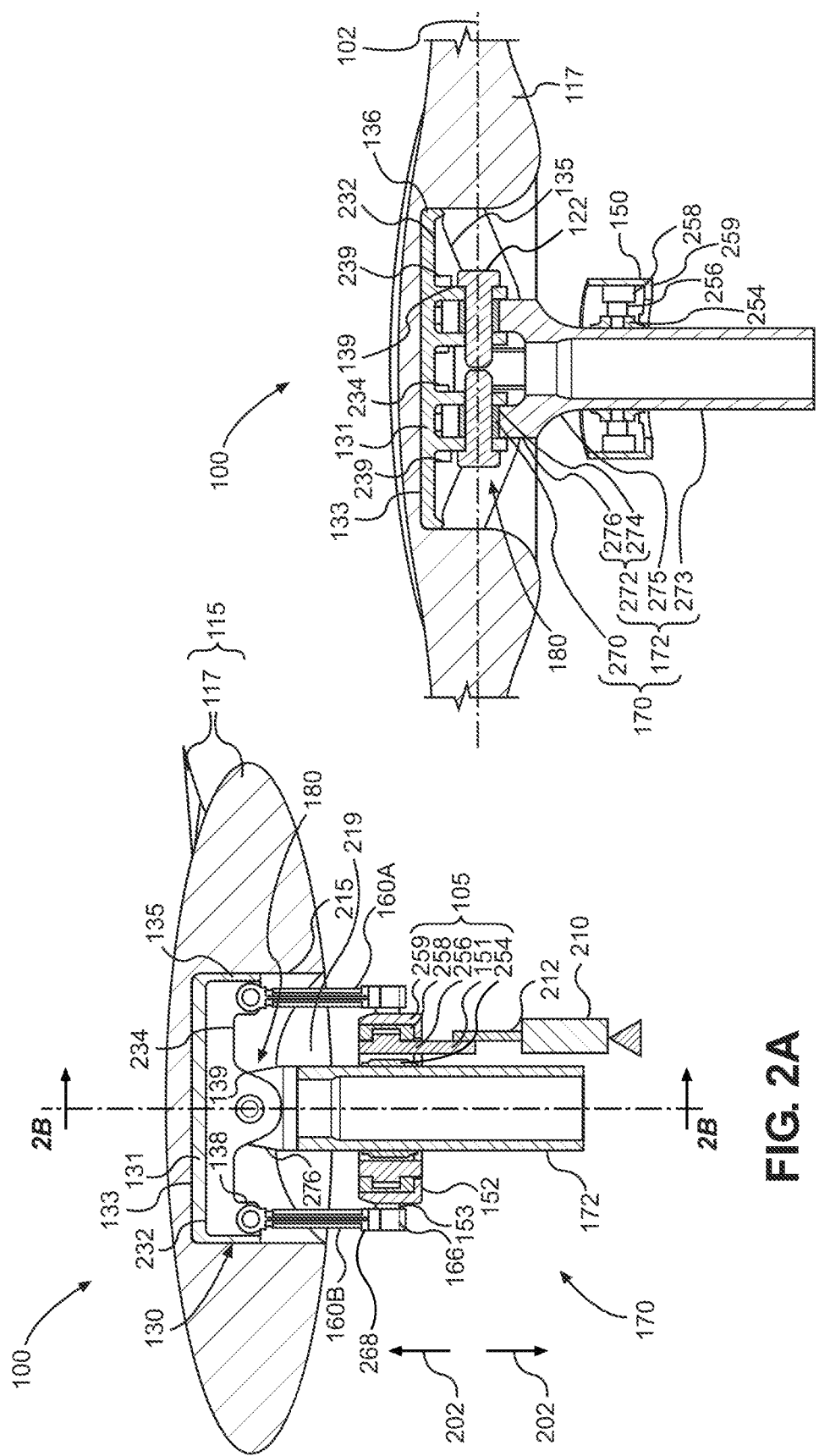

ROTOR ASSEMBLY

CROSS REFERENCE TO RELATED APPLICATIONS

This application claims priority to U.S. Provisional Application No. 63/333,679 filed Apr. 22, 2022, and U.S. Provisional Application No. 63/334,396 filed Apr. 25, 2022, both of which are incorporated by reference herein in their entireties.

TECHNICAL FIELD

The present disclosure relates to rotor systems for vertical takeoff and landing vehicles. In particular, the present disclosure relates to rotor assemblies that are incorporated in vertical takeoff and landing vehicles.

BACKGROUND OF THE INVENTION

Air mobility is generally recognized as the use of aircraft for daily commute activities traditionally accomplished primarily using an automobile. Air mobility has been highlighted as a potentially effective means of transportation to resolve traffic congestion, and reduce environmental pollution in various areas where automobile use is very high, such as in cities. Modern air mobility vehicles (AMVs) and other types of aircrafts are very sophisticated. Many implement multi-level integrated computing systems to control complex electro-mechanical devices and device assemblies to automate various functions of aircrafts and assist pilots during flight. For example, many electric vertical takeoff and landing (eVTOL) vehicles, which may be used as AMVs, may employ distributed propulsion systems (DEPs) that may include several rotor assemblies, as well as multiple types of rotor assemblies (e.g., tilting, non-tilting, lifting rotor assemblies).

AMVs may include lifting rotors and propulsion rotors. While some AMVs may be configured with different lifting rotors and propulsion rotors (e.g., as two different types of rotors), some AMVs may be equipped with tilting rotors that are able to operate in both lifting and propulsion modes. The lifting rotors may be primarily responsible for generating lift forces for taking off and landing an AMV. Flight-assistive operation of lifting rotors may be used from a time when an AMV transitions from a takeoff operation mode (e.g., hovering) into edgewise flight (e.g., non-takeoff or landing translational movement of an AMV), until the AMV reaches a minimum speed in a direction of the edgewise flight. Once that minimum speed is reached, lifting rotors may be stopped and aligned with the direction of flight to minimize their drag.

Different types of blade configurations for lifting rotors present different issues and advantages. For example, two-bladed rotors weigh less and may exhibit lower drag when stopped than rotors with more than two blades. On the other hand, two-bladed rotors may have the potential to generate large vibrations in certain situations if complex mitigations are not implemented. This may be particularly true in instances where lifting rotors are operated during edgewise flight of an AMV.

Many AMVs incorporate two-blade fixed pitch rotors that do not employ cyclic pitch control to mitigate oscillatory forces resulting from a lift disparity between advancing and retreating blades. This is because incorporating cyclic pitch control may require additional components, such as swash plates, that can increase the complexity and overall weight of the AMV. However, rotor assemblies for AMVs, such as eVTOLs, that incorporate fixed pitch rotors without cyclic pitch control may exhibit higher levels of resistance, vibrations, and noise during primary (e.g., lifting and taking off) and secondary (e.g., transitioning to edgewise flight) operational modes, than AMVs including rotor assemblies that do incorporate cyclic pitch control. This can make for a noticeably less pleasurable (e.g., rough or turbulent) ride for AMV passengers.

The present disclosure is accordingly directed to rotor assemblies that are incorporated in AMVs such as eVTOLs. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

Examples described herein include devices, systems, and methods directed toward a rotor assembly including a hub assembly and a shaft assembly. The hub assembly may include a hub and a first coupling for coupling the hub to an actuator, and the shaft assembly may be coupled to the hub assembly with a second coupling. In some examples, the second coupling may be configured to facilitate rotation of the hub relative to a shaft of the shaft assembly. In other examples the rotor assembly may include a rotor blade coupled to the hub assembly with a third coupling, the rotor blade being configured to rotate with the shaft. According to one aspect, the first coupling may be configured to transmit movements of the actuator to the hub to facilitate cyclic pitch control of the rotor blade.

Various additional aspects of exemplary devices, systems, and methods according to the present disclosure related to rotor assemblies may include one or more of the following features: the first coupling may include a gimbal, a first linkage coupling the hub to the gimbal, and a second linkage coupling the hub to the gimbal; the gimbal may be mounted on the shaft and configured to rotate about a third axis that is perpendicular to a first axis of rotation of the shaft, and rotation of the gimbal may cause the first linkage and the second linkage to rotate the hub about a second axis defined by the second coupling; the gimbal may include an inner race engaged to the shaft, an outer race disposed in a carrier that is coupled to the first linkage and the second linkage, a ring positioned between the inner race and the outer race, and in some examples, the inner race and the outer race may be configured to rotate relative to the ring during rotation of the shaft; and the gimbal may include an inner race engaged to the shaft, an outer race disposed in a carrier that is coupled to the first linkage and the second linkage, a ring positioned between the inner race and the outer race, a tab extending from the ring, and the tab may be configured to couple to an actuator that provides a fixed reference frame; and the hub may include a body configured to be coupled to the rotor blade by the third coupling and pairs of extensions that extend from a surface of the body, and each of the first linkage and the second linkage is coupled to a respective pair of extensions.

Furthermore, various additional aspects of exemplary devices, systems, and methods according to the present disclosure related to rotor assemblies may include one or more of the following features: the rotor shaft includes arms extending from a proximal body of the shaft, the hub includes a body configured to be coupled to the rotor blade by the third coupling and pairs of extensions that extend from a surface of the body, and each pair of extensions is configured to receive and be coupled to a respective one of the arms; and at least one fastener disposed in through-holes defined by the arms and the pairs of extensions, the at least one fastener extending coaxially relative to an axis of rotation of the hub for the rotation of the hub relative to the shaft; bearings disposed in through-holes defined by the arms of the shaft assembly, the bearings may be configured to receive at least one fastener of the second coupling, and the bearings may be disposed to extend coaxially relative to an axis of rotation of the hub for the rotation of the hub relative to the shaft.

Additionally, various aspects of exemplary devices, systems, and methods according to the present disclosure related to rotor assemblies may include one or more of the following features: the hub is disposed within a recess defined by a hub receiver of the rotor blade, and a body of the hub defines a plurality of through-holes configured to receive fasteners of the third coupling that are configured to couple the body of the hub to an inner surface of the hub receiver that defines the recess; the hub may be configured to rotate relative to the shaft about an axis defined by the second coupling between approximately +15 degrees and approximately −15 degrees; the first coupling may include a control rod disposed within the shaft and a link coupled to the control rod and the hub, and the control rod may be configured to engage an actuator and move within the shaft; and the first coupling may include a bearing assembly positioned within the hub and a bearing extension that extends from the bearing assembly and is configured to be coupled to an actuator.

In another example, an exemplary rotor assembly according to the present disclosure may include a hub assembly including a hub and a first coupling, a shaft assembly coupled to the hub assembly with a second coupling, and a rotor blade coupled to the hub assembly with a third coupling. The first coupling may be configured to couple the hub to a plurality of actuators. In some examples, the second coupling may be configured to facilitate rotation of the hub relative to a shaft of the shaft assembly, and the rotor blade may be configured to rotate with the shaft. According to aspects of the present disclosure, the first coupling may be configured to transmit movements of the plurality of actuators to the hub to facilitate cyclic pitch control of the rotor blade.

Various additional aspects of exemplary devices, systems, and methods according to the present disclosure related to rotor assemblies may include one or more of the following features: the rotor blade may include a two-bladed rotor blade having a fixed pitch; a gimbal, a first linkage coupling the hub to the gimbal, a second linkage coupling the hub to the gimbal, a first tab extending from the gimbal, the first tab being configured to be coupled to a first one of the plurality of actuators, and a second tab extending from the gimbal, the second tab being configured to be coupled to a second one of the plurality of actuators; each first coupling may include a bearing assembly, a first bearing extension extending from the bearing assembly, and a second bearing extension extending from the bearing assembly, the first bearing extension may be configured to be coupled to a first one of the plurality of actuators, and the second bearing extension may be configured to be coupled to a second one of the plurality of actuators; and the hub may be configured to rotate relative to the shaft about an axis defined by the second coupling between approximately +15 degrees and approximately −15 degrees.

In another example, an exemplary rotor assembly according to the present disclosure may include a hub assembly including a hub and a first coupling, a shaft assembly coupled to the hub assembly with a second coupling, and a rotor blade coupled to the hub assembly with a third coupling. The first coupling may be configured to couple the hub to an actuator. According to some aspects of the present disclosure, the second coupling may be configured to facilitate rotation of the hub relative to a shaft of the shaft assembly, and the rotor blade may be configured to rotate with the shaft. In some examples, the rotor shaft may include arms extending from a proximal body of the shaft, the hub includes pairs of extensions that extend from a surface of the body, each pair of extensions may receive and be coupled to a respective one of the arms, and the first coupling may be configured to transmit movements of the actuator to the hub to facilitate cyclic pitch control of the rotor blade. In still other examples, the rotor blade includes a two-bladed rotor blade having a fixed pitch.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1A depicts an exemplary rotor assembly, according to one or more embodiments.

FIG. 1B depicts an exemplary hub assembly, according to one or more embodiments.

FIG. 1C depicts an overhead view of the rotor assembly of FIG. 1A, according to one or more embodiments.

FIG. 2A depicts a cross-sectional view of the rotor assembly of FIG. 1A, from a plane corresponding to line 2A-2A of FIG. 1C.

FIG. 2B depicts a cross-sectional view of the rotor assembly of FIG. 1A, from plane corresponding to line 2B-2B of FIG. 1C.

DETAILED DESCRIPTION OF EMBODIMENTS

Figure 3A:
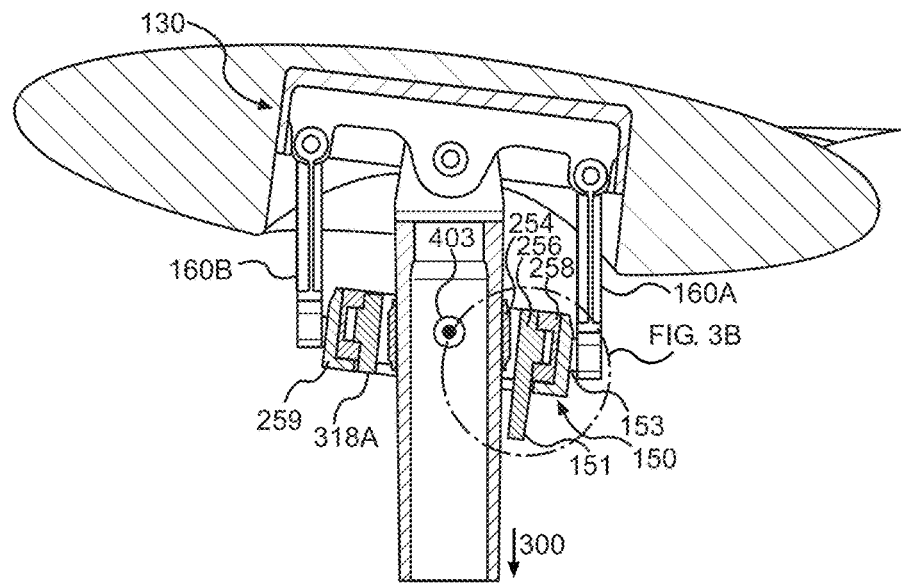
FIG. 3A depicts a cross-sectional view of the rotor assembly of FIG. 1A in a titled state, from a plane corresponding to line 2A-2A of FIG. 1C.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value. In this disclosure, unless stated otherwise, any numeric value may include a possible variation of +10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Various embodiments of the present disclosure relate generally to systems and methods for providing rotor assemblies for AMVs. Some AMVs may include a fuselage, one or more wings, and two types of rotors-lifting rotors and propulsion rotors. Propulsion rotors in some AMVs may be provided by tilting rotors. However, regardless of whether propulsion rotors are configured to tilt, the lifting rotors are primarily responsible for generating lift forces for taking off and landing an AMV. In addition to takeoff and landing, lifting rotors for an AMV may be used to operate during an edgewise flight mode of operation. Edgewise flight for an AMV may include translational movement of the AMV that is not part of taking off or landing. Flight assistive operation of lifting rotors may be used from a time when an AMV transitions from a takeoff operation mode (e.g., hovering) into edgewise flight, until the AMV reaches a minimum speed in a direction of the edgewise flight. Once that minimum speed is reached, lifting rotors may be stopped and aligned with the direction of flight to minimize their drag.

While lifting rotors can assist an AMV in edgewise flight, different types of blade configurations for lifting rotors present different issues and advantages that may impact, to varying degrees, other design requirements for the AMV. In turn, various constraints for achieving or meeting these requirements—cost, overall weight, part availability, part compatibility, overall complexity—may factor into which blade configuration is utilized for the lifting rotors. For example, two-bladed rotors tend to exhibit lower drag than rotors with more than two blades when they are stopped. Also, two-bladed rotors may weigh less than three-bladed rotors, for example, and thus may make it easier for an AMV to reach a speed at and above which assistance from the lifting rotors is no longer needed.

Oscillatory forces resulting from a lift disparity between advancing and retreating blades may be generated by rotor assemblies during edgewise flight. These oscillatory forces may be minimized by applying cyclic pitch change and/or employing more than two rotor blades per rotor. However, many AMVs incorporate two-blade fixed pitch rotors that do not employ cyclic pitch control. Although these types of rotor assemblies are less complex than those that include, for example, a swash plate, the fixed pitch rotor configuration can yield large vibratory forces and moments in forward flight. As a result of these vibratory forces, system weight may effectively increase during flight. In turn, the potential for AMV passengers to experience a rougher ride may ultimately be increased.

Swashplates, stand-alone devices that may be located above or below a hub and connected to the hub by multiple linkages, may be used for cyclic pitch control. Generally, a swash plate may convert flight maneuver input from a pilot into a motion of rotor blades so that at the same time: (1) an angle of attack of an advancing blade can be reduced, and (2) an angle of attack of a retreating blade can be increased, to balance out the lift generated by the advancing blade. However, swashplates are typically complex and include many components that make for a heavy assembly to go with the above-mentioned linkages that may also be of substantial weight. A swashplate may include an entraining disc controlled by three actuating devices to change the pitch of rotor blades collectively and/or cyclically. In addition, a swashplate may require frequent checks and maintenance to ensure respective structural and operational integrity, and generally increase a complexity of a rotor assembly.

Various embodiments of the present disclosure relate generally to systems and methods for providing rotor assemblies for AMVs, such as eVTOLs, that optimally reduce resistance, vibrations, and noise during primary (e.g., lifting and taking off) and secondary (e.g., transitioning to edgewise flight) operational modes. More specifically, exemplary rotor assemblies according to the present disclosure may include a hub that is operatively engaged with an actuator in a simple configuration configured to: (A) provide cyclic pitch control of a two-blade rotor attached to the hub, and (B) reduce vibratory forces and moments without the use of a swashplate.

FIG. 1A depicts an exemplary rotor assembly 100, according to one or more embodiments. According to one example of the present disclosure, the rotor assembly 100 may include a rotor blade 115 (e.g., a blade pair), a hub assembly 120, a shaft assembly 170, and an actuator 210 (illustrated schematically in FIG. 2A). In some examples, the actuator 210 may include hydraulic actuator. In other examples, the actuator 210 may include similar components, and operate in a similar fashion, as a solenoid. In still other examples, the actuator may include a pneumatic actuator.

FIG. 1B depicts an example of the hub assembly 120 that may be incorporated in the rotor assembly 100, according to one or more embodiments. In some examples, the hub assembly 120 may include a hub 130 and a first coupling 140 configured to operatively couple the hub 130 to the actuator 210. A second coupling 180 may be provided between the hub assembly 120 and the shaft assembly 170. A portion of the second coupling 180 depicted in FIG. 1B includes a second extension 139 that extends from the hub 130 and an assembly fastener 122 engaged with the second extension 139. The rotor assembly 100 may include a third coupling 190 between the hub 130 and the rotor blade 115. Along with the second coupling 180, the third coupling 190 may operatively couple the rotor blade 115 to the shaft assembly 170 such that rotation of a shaft 172 about a first axis 101 causes rotation of the rotor blade 115 about the first axis 101. In addition, the second coupling 180 may enable rotational movement of the hub 130 about a second axis 102 and relative to the shaft 172 of the shaft assembly 170.

As shown in FIG. 1B, the first coupling 140 may include a gimbal 150, first and second linkages 160A, 160B extending between the hub 130 and the gimbal 150, and a tab 151 extending from an end face 152 of the gimbal 150. A "gimbal" according to the present disclosure includes any joint that facilitates pivoting motion about at least one axis. For example, a gimbal may include one or more of: a universal joint, a "full" gimbal configured for pivoting motion about two orthogonal axes, or a "half" gimbal (also referred to as a trunnion mount) configured for pivoting motion about one axis. Furthermore, at least with respect to pitch changing movements of exemplary hub assemblies described herein, the terms pivot, tilt, and rotate are used interchangeably.

The first and second linkages 160A, 160B may be secured to respective pairs of first extensions 138 that extend the first body 131 of the hub 130. More specifically, each pair of first extensions 138 may be configured to receive: (1) a first head 162 of a respective one of the first and second linkages 160A, 160B along a plane that is normal to a plane corresponding to a first surface 133 of the first body 131; and (2) a fastener along an axis coincident with a center of first apertures 137 defined by the first extensions 138. According to some aspects of the present disclosure, each first head 162 may pivot about the axis coincident with centers of a respective pair of first apertures 137 the first head 162 is positioned between.

Opposite to an end including a respective first head 162, each of the first and second linkages 160A, 160B may define a coupling feature 166, such as an aperture or recess, configured to accommodate a fastener that secures a respective one of the first and second linkages 160A, 160B to the gimbal 150. In some examples, a receiver 153 of the gimbal 150, the coupling feature 166, together with a fastener securing the coupling feature 166 to the receiver 153, may be configured to accommodate a degree of relative movement between the gimbal 150 and the first and second linkages 160A, 160B. As described in more detail below, this relative movement may occur when a force from an actuator is applied to the gimbal 150 through the tab 151 of the first coupling 140. A body of the tab 151 extends from an end face 152 of the gimbal 150 and may define an aperture that may receive a fastener configured to secure an actuator arm 212 (FIG. 2A) to the tab 151. While a single tab 151 is illustrated in FIG. 1B, a person of ordinary skill in the art would understand that other numbers of tabs, distributed in various configurations about a circumference of an end of gimbal 150, are envisioned.

FIG. 1C depicts an overhead view of the rotor assembly 100 of FIG. 1A, and more specifically the rotor blade 115 of the rotor assembly 100 with shaft assembly 170 omitted, according to one or more embodiments. The rotor blade 115 may include a hub receiver 117 and two blades 115 as shown. In some examples, the rotor blade 115 may be provided as a composite blade. In other examples, the rotor blade 115 may include three or more blades. In still other examples, the rotor blade 115, including the hub receiver 117, may be a monolithic blade pair and thereby provide a one-piece structure that includes two blades. While the blades of the rotor blade 115 are illustrated in FIG. 1C as having a particular shape, a person of ordinary skill in the art would understand that other blade shapes are envisioned.

In addition to the rotor blade 115, FIG. 1C includes section lines 2A-2A and 2B-2B. FIGS. 2A and 2B depict cross-sectional views of the rotor assembly of FIG. 1A, respectively from planes corresponding to lines 2A-2A and 2B-2B of FIG. 1C. As shown in FIG. 2A, the first and second linkages 160A, 160B may extend between the hub 130 and the gimbal 150, and the tab 151 extending from the end face 152 of the gimbal 150. The first and second linkages 160A, 160B may be secured to first extensions 138 that extend from a first body 131 of the hub 130. In one example, the first extensions 138 may extend from first ribs 234 formed on the second surface 232 of the hub 130 as shown FIGS. 2A and 2B. In other examples, the first extensions 138 may extend directly from the second surface 232.

As also shown in FIGS. 2A and 2B, the gimbal 150 may be mounted to the shaft 172 of the shaft assembly 170. The gimbal 150 may include a ring 256 disposed between inner and outer races 254, 258, and a carrier 259 surrounding the outer race 258 and engaged to the first and second linkages 160A, 160B. With further reference to FIG. 2B, the shaft assembly 170 may include a pair of bearings 270 in addition to the shaft 172. Each bearing 270 may be positioned in a third aperture 274 defined by a respective shaft arm 276 of a second head 272 of the shaft 172. Furthermore, each bearing 270 of the shaft assembly 170 may include ball bearings, needle bearings, contact bearings, or the like. The shaft arms 276 may extend from a transition 275 of the shaft 172 defined between the second head 272 and a proximal body 273 of the shaft 172. In some examples, the gimbal 150 may be mounted on the shaft 172 proximate to or in an area including the transition 275.

Exemplary components of the second coupling 180, which is generally designated in FIGS. 2A and 2B, will now be discussed with reference to FIGS. 2A and 2B. The shaft 172 provides part of the second coupling 180 of the rotor assembly 100. More specifically, the second coupling 180 includes the third apertures 274 defined by the shaft arms 276, the bearings 270 positioned in the third apertures 274, second extensions 139 of the hub 130, and one or more assembly fasteners 122. In one example, the second extensions 139 may protrude from second ribs 239 formed on the second surface 232 of the first body 131 of the hub 130. In other examples, the second extensions 139 may protrude directly from the second surface 232 of the first body 131 of the hub 130. The second coupling 180 generally provides a coupling between the hub assembly 120 and the shaft assembly 170, and more specifically provides a coupling between the hub 130 and the shaft 172 that enables a pitch of the rotor blade 115 to be modified with the operation of the actuator 210.

The assembly fasteners 122 may be fitted to the second extensions 139 of the hub 130. With the assembly fasteners 122 being received in the bearings 270 as shown in FIG. 2B, movement of the hub 130 about the second axis 102 is enabled. More specifically, rotational movement of the fasteners about the second axis 102 is facilitated by the bearings 270. In turn, this configuration may allow the hub 130 to pivot about the second axis 102 upon application of a force in a first direction 201 from the hub 130 toward the shaft 172 or a second direction 202 from the shaft 172 toward the hub 130, as shown in FIG. 2A. Such a force may be applied generally to a first region of the hub 130 on one side of the second axis 102, and/or a second region of the hub 130 on an opposite side of the second axis 102. As described in more detail below, the first coupling 140 is configured to transmit a force generated by the movement of the actuator 210 to outer extents of the first and second regions of the hub 130.

With reference to FIGS. 1A and 1B, a third coupling 190 of the rotor assembly 100 is provided between the rotor blade 115 and the hub 130 of the hub assembly 120. More specifically, the hub 130 may include a plurality of through-holes 132 formed in the first body 131 that are configured to receive fasteners. The fasteners may extend through coupling features provided in the rotor blade 115 corresponding to the through-holes 132 of the hub 130. In some examples, the fasteners may include screws, bolts, rivets, or other similar fasteners configured to extend through respective through-holes 132 in the first body 131 of the hub 130. The through-holes 132 may be configured to receive the fasteners and secure the rotor blade 115 to the hub 130 of the hub assembly 120. In some examples, the through-holes 132 may be threaded. In other examples, the third coupling 190 may include, instead or in addition to threaded versions of the through-holes 132, a plurality of nuts screwed to thread portions of bolts provided as the fasteners. With any of the examples for a third coupling 190 discussed above, the rotor blade 115 may be secured to the hub assembly 120 such that the rotor blade 115 rotates with the shaft 172 about the first axis 101.

In addition to an engagement between the rotor blade 115 and the hub 130 provided by the fasteners of the third coupling 190, a second body 134 of the hub 130 may be accommodated by an inner surface 215 of the rotor blade 115, shown in FIG. 2A. As also shown in FIG. 2A, flanges 135 of the second body 134 may be positioned within a recess 219 of the rotor blade 115 defined by the inner surface 215. In some examples, the flanges 135 may be received by recess 219. In other examples the flanges 135 may be in abutting contact with corresponding portions of the inner surface 215. In still other examples, the flanges 135 may be friction fit to the inner surface 215 that defines the recess 219. In addition to the flanges 135, as shown in FIG. 2B, transition walls 136 of the second body 134 may also be received within the recess 219 of the rotor blade 115. As shown in FIG. 2, each transition wall 136 extends between opposing ends of the flanges 135.

Turning back to FIG. 2B, as with the flanges 135, the transition walls 136 may simply be received by, in abutting contact with, or friction fit to the inner surface 215 of the rotor blade 115 (e.g., blade pair). In still other examples, the transition walls 136 may be formed with a curved profile or otherwise be shaped and sized such that surfaces of the transition walls 136 do not contact the inner surface 215. Exemplary hubs according to the present disclosure, such as the hub 130, may be provided with second bodies 134 having different configurations so to be usable with multiple rotor blades having different recess configurations.

Operation

Exemplary operations of the exemplary rotor assembly 100 illustrated in FIGS. 1A-1C, 2A, and 2B will now be described with reference FIGS. 3A through 5C.

As shown in FIG. 3A, the rotor assembly 100 is illustrated in an exemplary first actuated state. More specifically, the gimbal 150 is positioned about a monocyclic axis 403 extending into the page in FIG. 3A (see also FIG. 4) as a result of an actuator having moved the tab 151 in the first direction 201 (FIG. 2A) from the hub 130 towards the shaft 172. As shown, the gimbal 150 is rotated about the monocyclic axis 403 as a result of the movement of the tab 151. In addition, the rotation by the gimbal 150 has been converted, via the coupling features 166 of the first and second linkages 160A, 160B and fasteners coupling the coupling features 166 to the receivers 153 of the gimbal 150, into linear movements of the first and second linkages 160A, 160B. Thus, as shown, the first coupling 140 has converted the rotational movement of the gimbal 150 about the monocyclic axis 403 into linear movement of the first linkage 160A away from the hub 130, and a corresponding linear movement of the second linkage 160B toward the hub 130.

The tab 151, which is moved in the first direction 201 from the hub 130 towards the shaft 172 in FIG. 3A, is included as part of the gimbal 150. More specifically, the tab 151 extends from a ring 256 positioned between an inner race 254 and an outer race 258 of the gimbal 150. The outer race 258 being positioned between the ring 256 and a carrier 259 of the gimbal 150 that includes the coupling feature 166 that receives the second fasteners 268 by which the first and second linkages 160A, 160B are coupled to the gimbal 150. In one example, as the shaft 172 rotates, both the inner race 254 and outer race 258 also rotate. The inner race 254 rotates as a result of being engaged with an outer surface of the proximal body 273 of the shaft 172. Rotation of the outer race 258 occurs as a result of being coupled to the hub 130 by the first and second linkages 160A, 160B—the hub 130 being driven to rotate by the shaft assembly 170 as a result of the second coupling 180 there between.

However, the ring 256 does not rotate with the shaft 172. More specifically, with reference to FIG. 3B, the ring 256 may include a first engagement surface 310 configured to face the inner race 254. In one example, the first engagement surface 310 and outer surface 340 of the inner race 254 may provide bearing surfaces configured to slide relative to each other. In other examples, a plurality of bearings (e.g., ball bearing, needle bearing, or the like) may be provided in/on the first engagement surface 310 or the outer surface 340. In still other examples, the outer surface 340 may define first shoulders 345 on opposite end faces. These shoulders 345 may be configured to house ball bearings enabling the inner race 254 to rotate relative to the ring 256 of the gimbal 150.

Similar to the first engagement surface 310, a second engagement surface 312 of the ring 256 may face and engage an inner surface 360 of the outer race 258. In some examples, the inner surface 360 may define an annular recess 362 configured to receive a raised annular band 314 of the ring 256. Second shoulders 316 defined by the second engagement surface 312 may engage upper and lower portions 364 of the inner surface 360 disposed above and below the recess 362 of the outer race 258. In one example, portions of the second engagement surface 312 and the inner surface 360 may contact each other and provide bearing surfaces configured to slide relative to each other. In other examples, one or more bearings (e.g., ball bearings, needle bearings, or the like) may be provided in or on the raised annular band 314 of the ring 256 or the upper and lower portions 364 of the inner surface 360 of the outer race 258 proximate to the second shoulders 316.

Figure 3B:
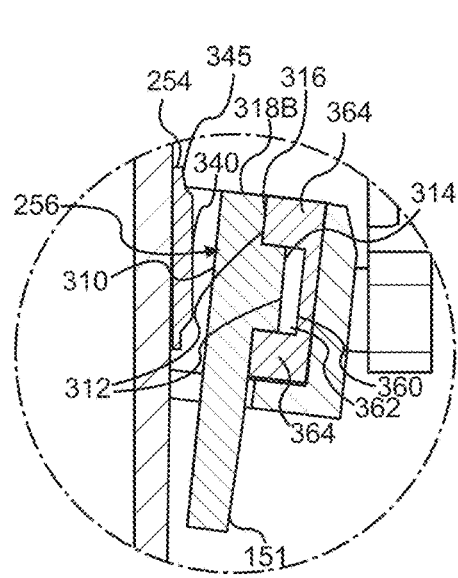
FIG. 3B is an enlarged in view of a portion of FIG. 3A.
Figure 4:
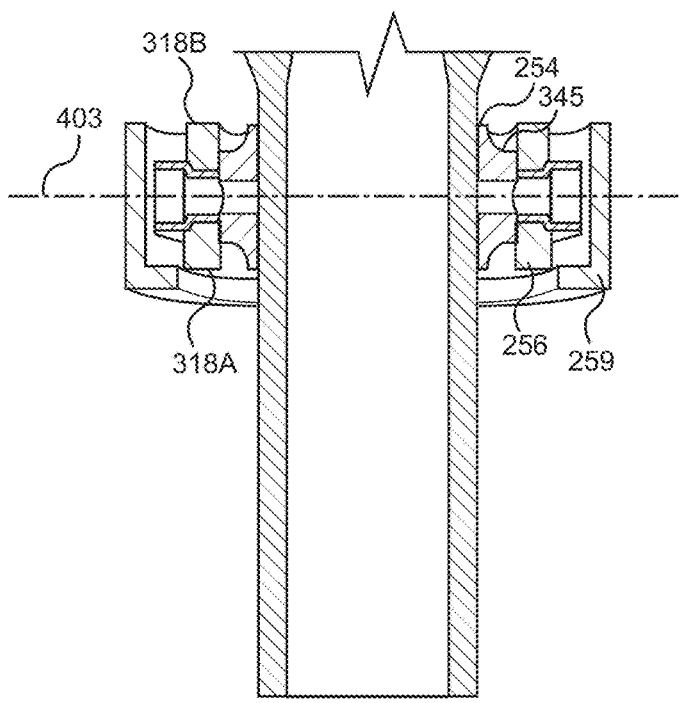
FIG. 4 depicts a partial cross-sectional view of the rotor assembly of FIG. 1A, from a plane corresponding to line 4-4 of FIG. 3A.
Figure 5:
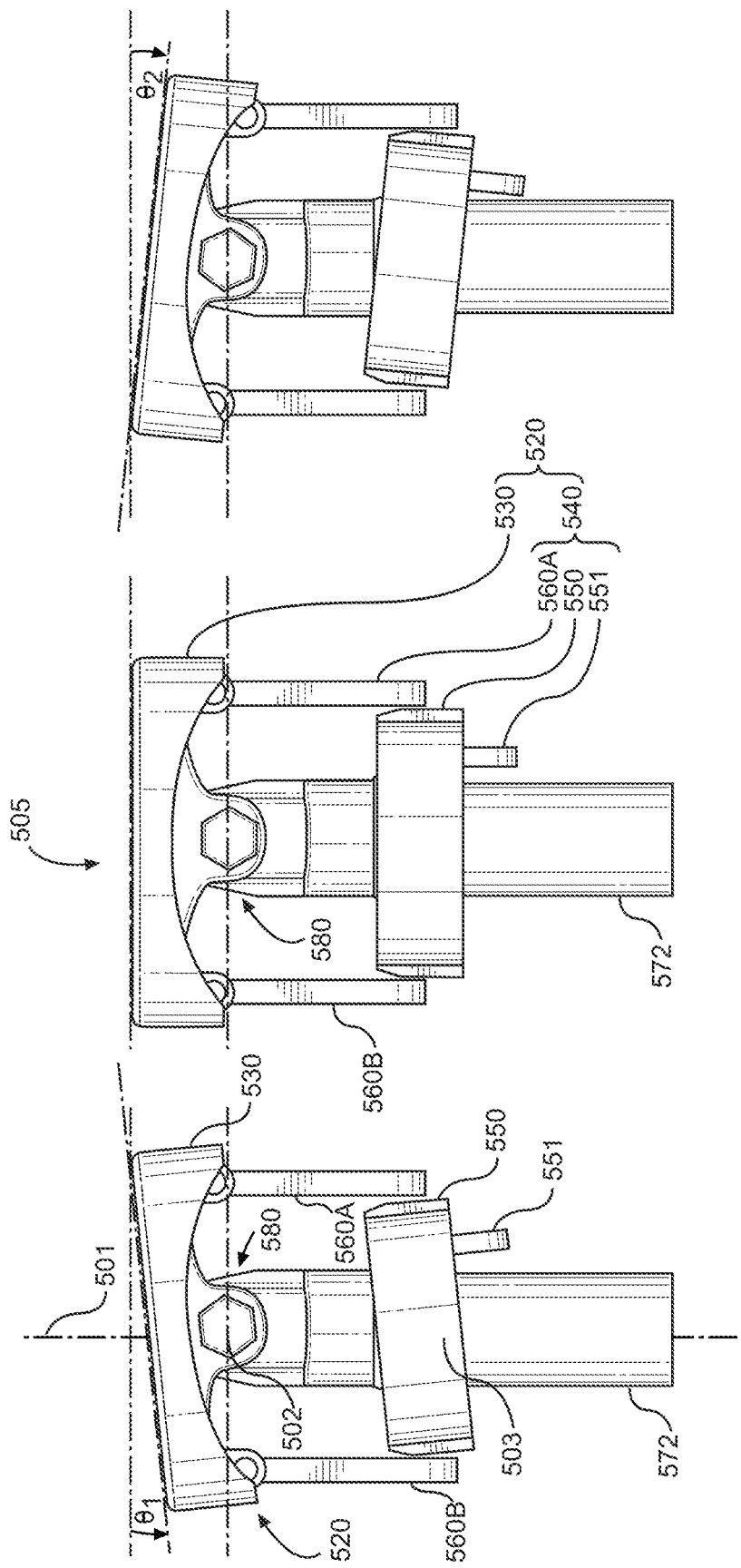
FIGS. 5A, 5B, and 5C respectively depict an exemplary hub assembly in a first actuated state, an unactuated state, and a second actuated state.

While the ring 256 and inner and outer races 254, 258 are illustrated in FIGS. 3A and 3B with the ring 256 including the raised annular band 314 received in the recess 356, a person of ordinary skill in the art would understand that other configurations are within the scope of the present disclosure. For example, both the inner and outer races 254, 258 may define recesses that respectively receive raised annular bands formed on the first and second engagement surfaces 310, 312 of the ring 256. In other examples, the first or second engagement surface 310, 312 may define a recess configured to receive a structure protruding from the inner or out race 254, 258. In still other examples, multiple recesses and raised bands may be provided.

In another example, the ring 256 may include a first end face 318A (see FIG. 3A) that faces away from the hub 130 and a second end face 318B (see FIGS. 3A and 3B) that faces the hub 130. The first end face 318A may include defined therein, a track, or a groove, or a slot, or the like, configured to receive an engagement feature of the tab 151. In other examples, the ring 256 may define a protruding circumferential engagement feature that may be received in or otherwise be configured to be attached to a slot formed on the tab 151. In still other examples, either portion of the tab 151 and the ring 256 that engage the other may include bearing elements enabling the ring 256 to rotate with the inner and outer races 254, 258 and relative to the tab 151.

FIGS. 5A, 5B, and 5C depict an exemplary hub assembly 520 in a first actuated state, an unactuated state, and second actuated state, respectively. In a first actuated state illustrated in FIG. 5A, an actuator arm (not shown in FIG. 5A) is extended and a gimbal 550 is pivoted counter clockwise about a monocyclic axis 502. During operation of a rotor assembly including a hub assembly 520 of FIGS. 5A-5C, a shaft 572 will rotate about a longitudinal axis 501, as will a hub 530, with a second coupling 580. In turn, each of a first linkage 560A and a second linkage 560B will rotate past a location of a tab 551, which may be coupled to an actuator arm (not shown), and one of the first and second linkages 560A, 560B will be displaced upward, as shown by first linkage 560A in FIG. 5A. More specifically, one of the linkages will be displaced upward from a position when the hub assembly 520 is in the home position of FIG. 5B, a distance corresponding to an angle of inclination of the gimbal 550. As the first and second linkages 560A, 560B rotate past the tab 551 to a location corresponding to a location of the second linkage 560B as shown in FIG. 5A, that linkage will be displaced downward a substantially equal distance from the home position 505 as the upward distance traveled to reach the location of the first linkage 560A depicted in FIG. 5A.

As shown in FIG. 5B, in the unactuated state, surfaces of the hub 530 and end faces of the gimbal 550 may be positioned so as to be substantial parallel relative to another. In this home position 505 shown in FIG. 5B, a pitch of a rotor blade (e.g., blade pair) attached to the hub 530 corresponds to a normal state. Therefore, a cyclic pitch will not be implemented with a rotor assembly including the hub assembly 520 that remains in the unactuated state represented in FIG. 5B. In some examples, the angle of inclination of the gimbal 550 may substantially correspond to a pitch angle θ of the hub 530 and a rotor blade (e.g., blade pair) attached to the hub 530 via a third coupling. In other examples, the pitch angle θ and the angle of inclination for the gimbal 550 may have a proportional, set degree of variance, order of magnitude, or other type of relationship. With any of the above mentioned relationships, the angle of inclination of the gimbal 550 may remain constant as an actuator arm remains in an extended position, shown in FIG. 5A. As a result: (1) the first and second linkages 560A, 560B may respectively move up and down in a cyclic motion as the hub 530 rotates with the shaft 572; and (2) the hub 530 will remain rotated about the second axis 502 corresponding to the second coupling 580 to exhibit a pitch angle θ. More specifically, with reference to FIG. 5A, the hub 530 may be pivoted such that it and the rotor blade attached thereto exhibit a first pitch angle $\theta_1$, where a maximum pitch angle $\theta_{max}$ follows the relationship $-\theta_{max} < \theta_1 < 0°$. One of ordinary skill will recognize that the pitch angle θ for the hub 530 in the home position 505 of FIG. 5B is zero.

Turning to FIG. 5C, the tab 551 is illustrated in a retracted position such that the hub 530 is rotated clockwise about the second axis 502 and exhibits a second pitch angle $\theta_2$, where $0° < \theta_2 < \theta_{max}$. In some examples, an actuator arm may be controlled to by a system controller to move between a maximum extended position and a maximum retracted position based on monitored parameters for a respective rotor assembly and/or an AMV including the respective rotor assembly.

FIGS. 5A to 5C are described above as applying to situations in which a position of the actuator arm is held constant. In other examples, a position of an actuator arm may be modulated based on monitored parameters between different positions. More specifically, an actuator arm may be modulated between first and second extended positions such that the pitch angle θ of the hub 530 may move (e.g., oscillate) or otherwise change on a cyclic, ad-hoc, or other scheme of control basis, between pitch angles that are both less than 0°. In other examples, the position of an actuator arm may be modulated (cyclically, ad-hoc, or by another control scheme) between first and second retracted positions, and the hub may be rotated between pitch angles that are both greater than 0°. In still other examples, an actuator arm may be modulated in response to monitored operational parameters between extended and retracted positions on a cyclic, ad-hoc, or other scheme of control-basis.

Figure 6:
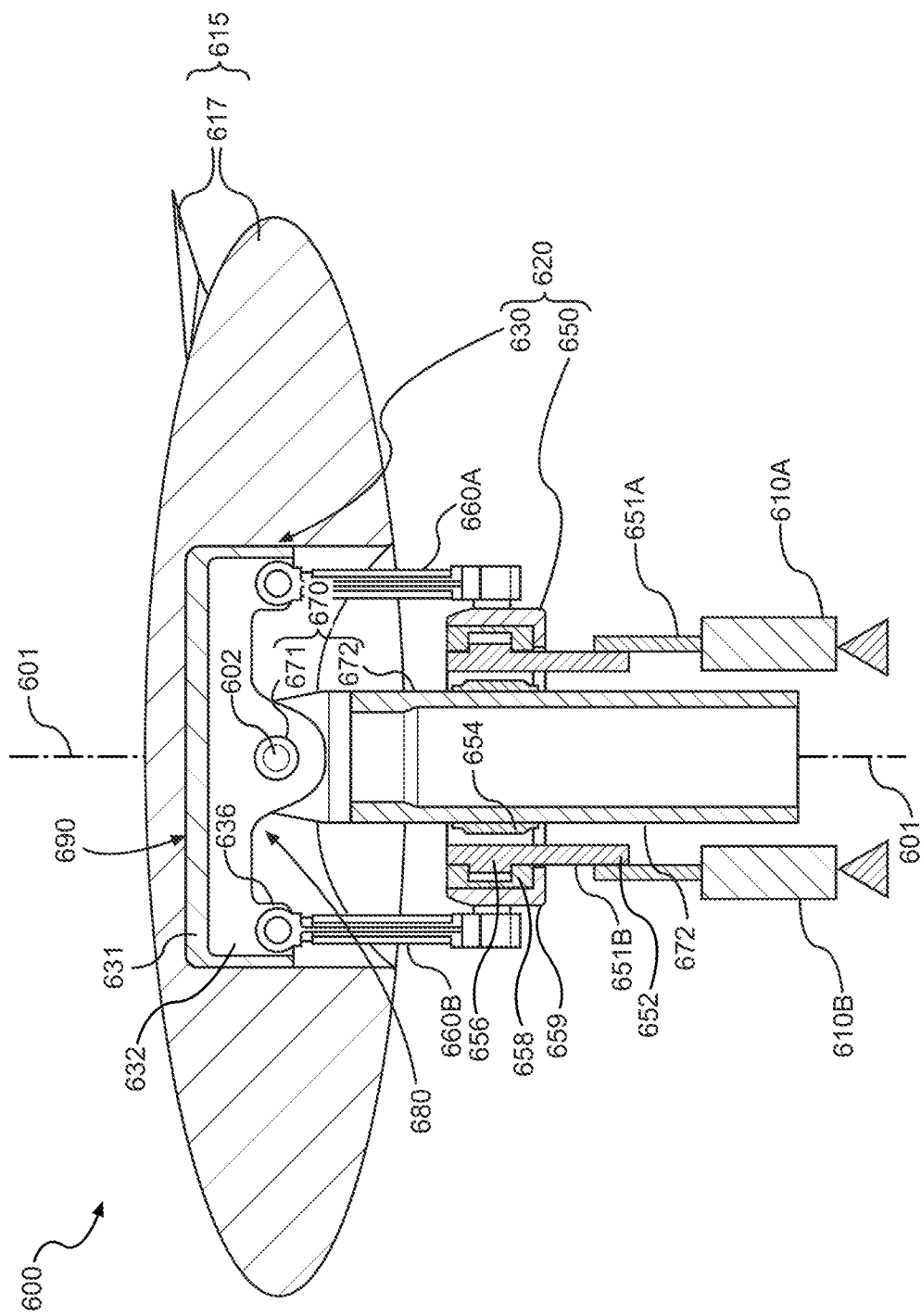
FIG. 6 depicts a rotated cross-sectional cut view of a rotor assembly, according to one or more embodiments.

FIG. 6 depicts a rotated cross-sectional cut view of a rotor assembly 600, according to one or more embodiments. More specifically, a portion of FIG. 6 to the right of an axis 601 may represent a view of a first plane, and a portion of FIG. 6 to the left of axis 601 may represent a view of a second plane rotated 90° out of a page from the first plane about the axis 601. As shown in FIG. 6, the rotor assembly 600 may include first and second actuators 610A, 610B, a rotor blade 615 (e.g., blade pair), a hub assembly 620, and a shaft assembly 670. The first actuator 610A, which is shown lies in a plane that is orthogonal to a plane including the second actuator 610B as being connected to second tab 651B.

In some examples, the hub assembly 620 may include a hub 630 and a first coupling 640 configured to operatively couple the hub 630 to the first and second actuators 610A, 610B. The rotor assembly 600 may further include a second coupling 680 between the hub 630 and the shaft assembly 670. In some examples, the second coupling 680 may include a gimbal. Furthermore, the rotor assembly 600 may include a third coupling 690 between the hub 630 and the rotor blade 615. Along with the second coupling 680, the third coupling 690 may operatively couple the rotor blade 615 to the shaft assembly 670 such that rotation of a shaft 672 of the shaft assembly 670 about an axis 601, causes rotation of the rotor blade 615 about the axis 601. In addition, the second coupling 680 may include bearings 671 and may enable pivoting movement of the hub 630 about multiple axes relative to a shaft 672 of the shaft assembly 670. Although bearings 671 along one axis are shown, it will be understood that the rotor assembly 600 may include other structures, particularly in the plane in which the second actuator 610B lies, to enable pivoting motion of the hub assembly 620 to pivot about multiple axes.

In one or more embodiments, the first coupling 640 may include a gimbal 650, first and second linkages 660A, 660B extending between the hub 630 and the gimbal 650, and first and second tabs 651A, 651B extending from an end face 652 of a ring 656 of the gimbal 650. The first and second linkages 660A, 660B may be secured to first extensions 636 that extend from a first surface 632 of a first body 631 of the hub 630. The gimbal 650 may be mounted to the shaft 672 of the shaft assembly 670, and include the ring 656 disposed between inner and outer races 654, 658 of the gimbal 650. In addition, the gimbal 650 may include a carrier 659 surrounding the outer race 658 and engaged to the first and second linkages 660A, 660B. The first and second tabs 651A, 651B may extend from the end face 652 and respectively be coupled to the first and second actuators 610A, 610B.

Figure 7:
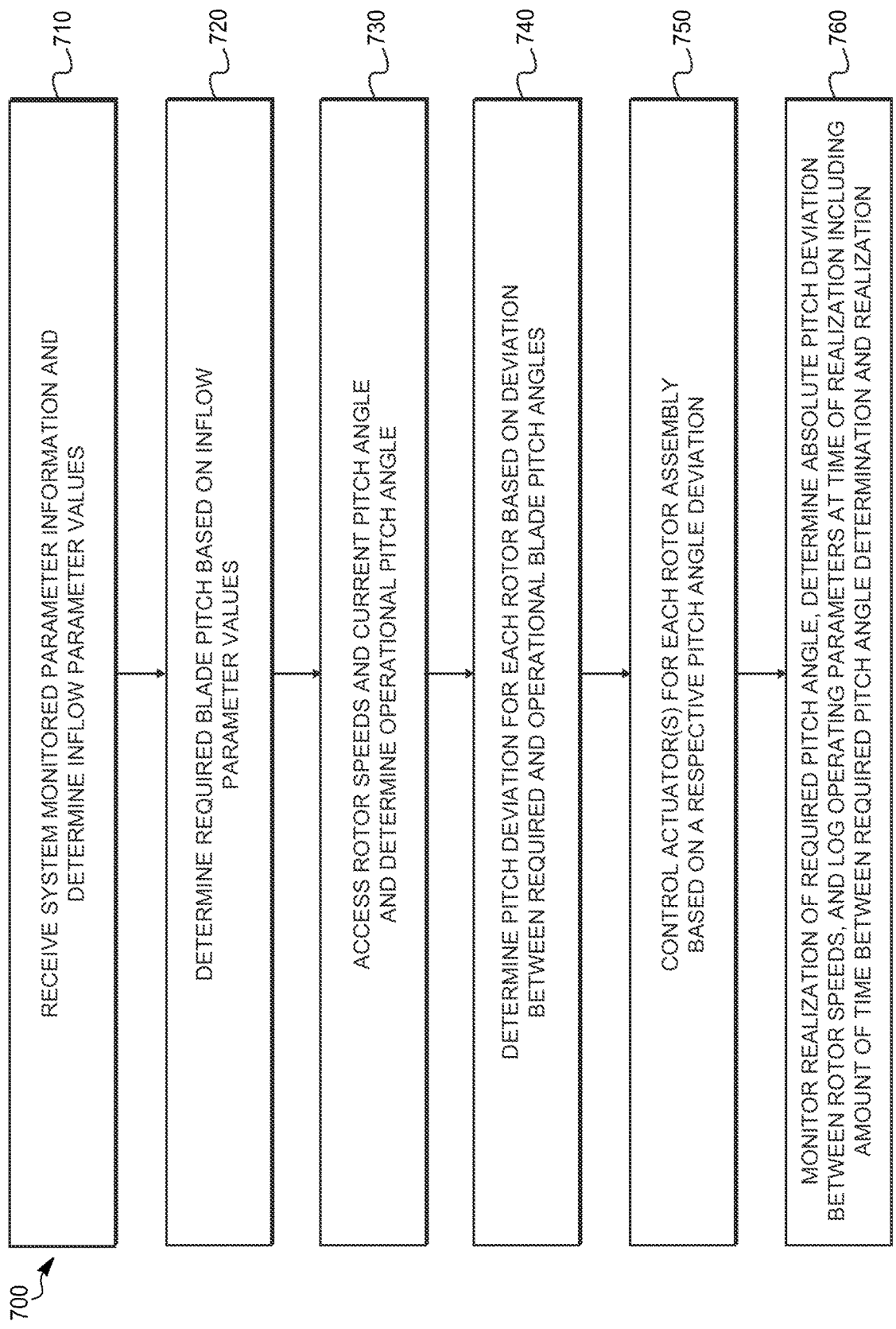
FIG. 7 depicts a flowchart of an example method for controlling a pitch of a rotor blade for a rotor assembly, according to one or more embodiments.

FIG. 7 depicts a flowchart of an example method 700 for controlling a pitch of a rotor blade (e.g., blade pair) for a rotor assembly, according to one or more embodiments.

At 710, system-monitored parameter information may be received and inflow parameter values, such as magnitude and direction (vector) may be determined.

At 720, a specified blade pitch angle may be determined based on the inflow parameter values.

At 730, current motor speeds and pitch angles may be detected or otherwise determined, and an operational pitch angle may be determined and/or registered.

At 740, pitch angle deviation for each rotor based on a deviation between a specified pitch angle and the operational (e.g., detected) pitch angle for each rotor assembly may be determined.

At 750, an actuator, pair of actuators, or other number of actuators, for each rotor assembly may be operated (continuously) based on a respective pitch angle deviation. More specifically, the positions of each actuator may be changed to resolve respective pitch angle deviations and for each rotor blade to exhibit a respective required pitch angle.

At 760, rotor blades for each rotor assembly may be monitored to identify when a respective specified blade pitch angle is realized. At that point, an absolute pitch angle deviation between pitch angles may be recognized from the then current operational pitch angles of the rotor blades. In turn, values of operating parameters at the time of realization, including an amount of time between required pitch angle determination and realization, may be logged in, for example, a memory.

Exemplary Implementations

Figure 8:
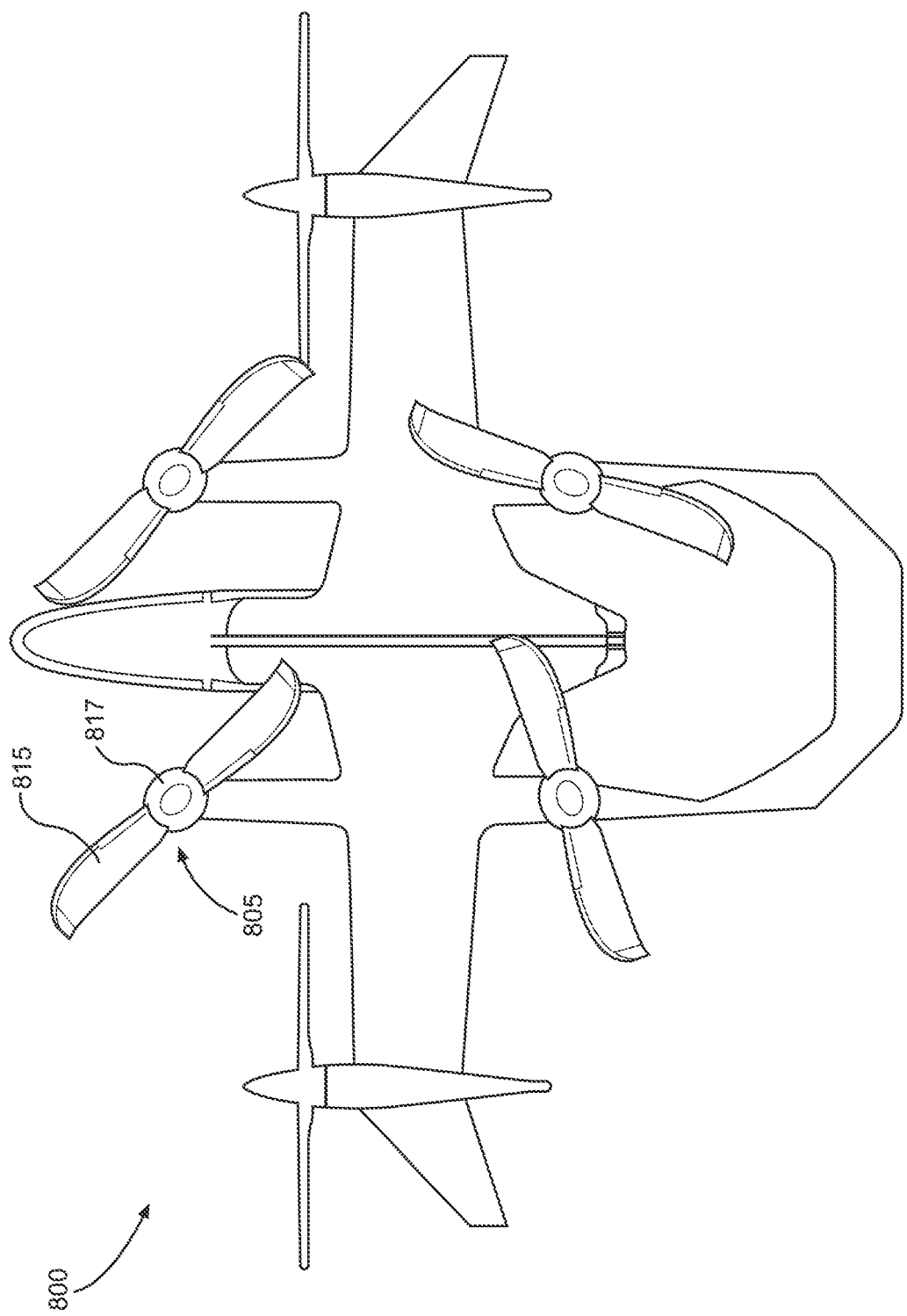
FIG. 8 depicts an exemplary air mobility vehicle ("AMV"), according to one or more embodiments.

Turning to FIG. 8, an exemplary AMV 800 including exemplary rotor assemblies 805 is depicted. The rotor assemblies 805 may be provided by any of the rotor assemblies 100, 600, 1300, 1400, 1500 described herein. In some examples, operation of any of the rotor assemblies 805 may include an actuator providing a monocyclic input by tilting/pivoting a hub through a first coupling that may include, for example, a gimbal, a control rod, or a bearing assembly according the present disclosure. For example, any the of the rotor assemblies 805 may include a gimbal, such as the exemplary gimbal 150, that receives a monocyclic input causing a portion of the gimbal engaged with an actuator to move up and down about a monocyclic axis, such as monocyclic axis 502 depicted in FIGS. 5A-5C, to change a cyclic pitch of a rotor blade 815 (e.g., blade pair) of one of the rotor assemblies 805 of FIG. 8. In one example, the rotor blade 815 may include a hub receiver 817 configured to receive a hub assembly, as described herein, and a two-bladed fixed pitch blade. In some embodiments, a range for a cyclic pitch of a rotor blade may be approximately between +/−15 degrees. The monocyclic input provided from the actuator through the coupling may be in response to a control signal initiated by a user and/or a controller.

In one or more examples, a cyclic pitch may be dependent on a horizontal flight speed of the exemplary AMV 800. For example, the cyclic pitch may be approximately +/−0 degrees when the AMV 800 hovers, takes-off or lands, and approximately between +/−10 to 15 degrees when flying horizontally with a rotor blade rotating at a number of revolutions per minute (RPM) that is less than a predetermined threshold. As a hub of one of the rotor assemblies 805, which may include, for example, the exemplary hub 130, is pivoted according to the systems, devices, and methods described herein, a cyclic pitch of a rotor blade 815 will vary about a pitch axis such as the second axis 102 identified in FIG. 1B.

Exemplary rotor assemblies according to the present disclosure, including the rotor assemblies 805, may leverage a variable speed electric rotor to vary thrust with exemplary hub assemblies described herein, to create cyclic pitch that may reduce vibratory forces and moments resulting in reduced system weight and a smoother ride for passengers. Accordingly, a cyclic control enabled the exemplary rotor assemblies, and exemplary hub assemblies in particular, described herein, may provide a method of reducing loads on each rotor assembly 805 and improve overall performance of the AMV 800.

Figure 9:
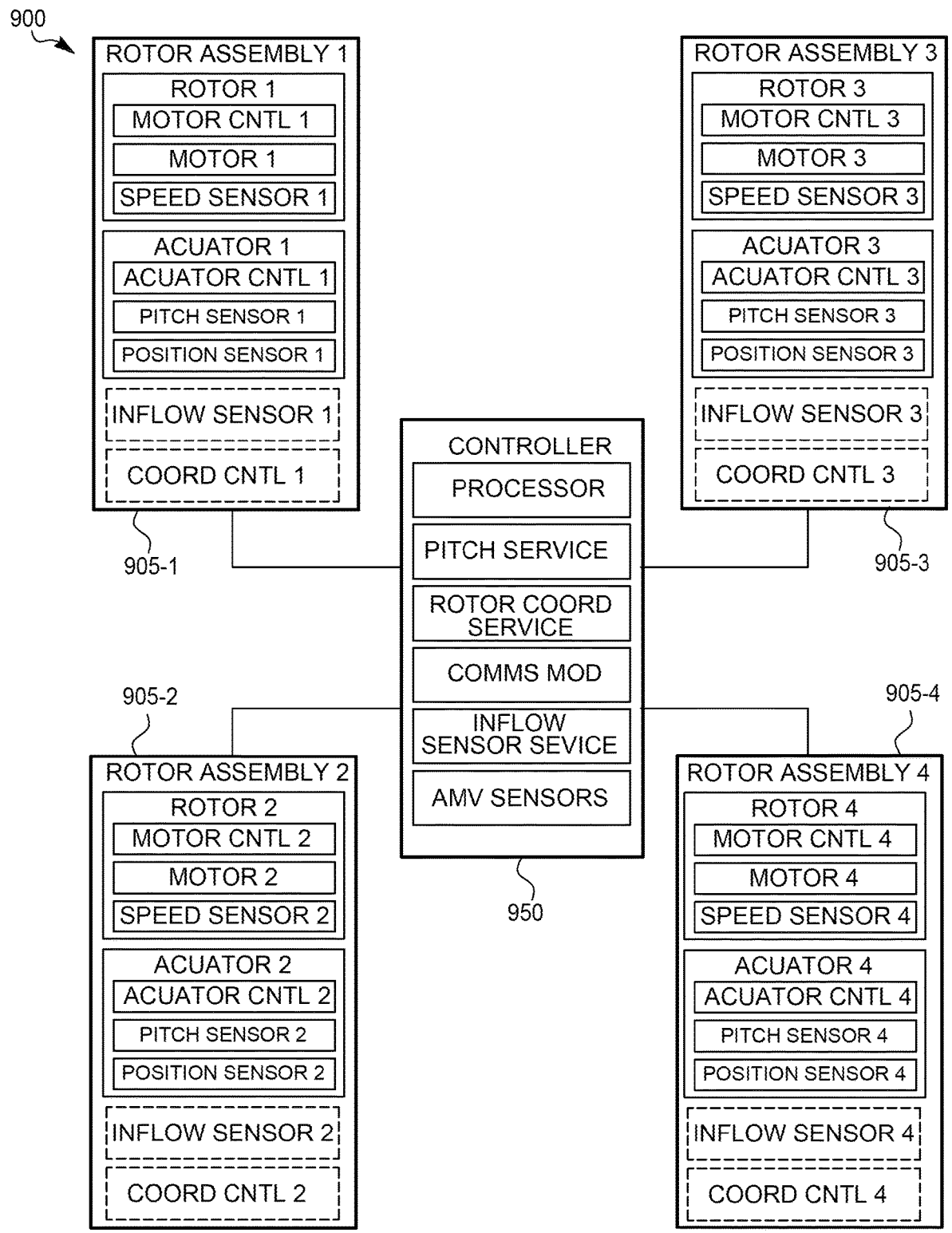
FIG. 9 depicts an exemplary system for optimizing rotations of multiple rotor assemblies incorporated in an exemplary vertical takeoff and landing vehicle, according to one or more embodiments.

FIG. 9 depicts an exemplary system for optimizing rotations of multiple rotor assemblies incorporated in an exemplary vertical takeoff and landing vehicle, according to one or more embodiments. In one embodiment, the system 900 may include a controller 950 and first, second, third, and fourth rotor assemblies 905-1, 905-2, 905-3, 905-4 ("rotor assemblies 905"). Each of the rotor assemblies 905 may include at least one rotor blade operated by a motor controlled by a motor controller based on data from a respective speed sensor. In addition, each of the rotor assemblies 905 may include an actuator operated by an actuator controller based on data from a respective pitch sensor that detects a pitch angle θ of a hub/rotor blade. In some examples, each rotor assembly may also be equipped with at least one position sensor to detect a position of one or more components of a coupling between a hub and an actuator (e.g., a gimbal, linkages, control rod). Readings from the position sensor may be compared to the readings from the pitch sensor to ensure a hub assembly is operating properly and/or has not been subject to a part irregularity.

In some embodiments, one or more of the rotor assemblies 905 may include an inflow sensor and/or a coordination controller. Each coordination controller may serve as part of a distributed control scheme or provide redundancy to the controller 950. That is, each coordination controller may independently operate a respective actuator in such a way as to change pitch angles of rotor blades as they rotate to minimize oscillatory forces generated in edgewise flight.

In one embodiment, the controller 950 may include a processor, a communications module, an inflow sensor, and various other sensors that provide data corresponding to a condition of an AMV, such as the AMV 800 of FIG. 8. In addition, the controller 950 may implement pitch angle modulation, rotor coordination, and inflow sensing services. Each of the services running or otherwise being implemented by the controller 950 can be part of or configured to be compatible with a software product that is at least partially provided by the controller 950. In one example, the software product can provide tools for system management, communication and coordination, modeling, motor operation, tracking rotor positions, tracking actuator positions, generating components of and supporting selections made through a user interface, and any other relevant features.

In one embodiment, the pitch service may determine pitch angles for each rotor assembly based on an inflow angle detected by an inflow sensor for the system 900, or determined by an inflow sensing service for the system 900 and/or each rotor assembly 905. In another embodiment, each rotor assembly 905 may include an inflow sensor as noted above, which detects an inflow angle for a respective rotor assembly and communicates that inflow angle to the controller 950 via the communications module ("comms mod" in FIG. 9). In still another embodiment, the pitch service may rely on information from AMV sensors to determine inflow parameters for each of the rotor assemblies 905. The rotor coordination service may be configured to receive outputs from the pitch service and determine motor speeds, pitch angles, and operations required for a respective required pitch angles to be realized by each rotor assembly. In one embodiment, motor speeds, motor operations, and actuator operations determined by the rotor coordination service may be communicated to motor and actuator controllers for the rotor assemblies via the communications module.

The controller 950, and the motor and actuator controllers of each rotor assembly, may each constitute a computing device including a processor, a memory storage, and a non-transitory computer-readable medium containing instructions that are executed by the processor. In addition, the controller 950 and each of the rotor assemblies 905 may include one or more sensors installed therein that is in communication with a respective processor.

Interchangeability

Figure 11:
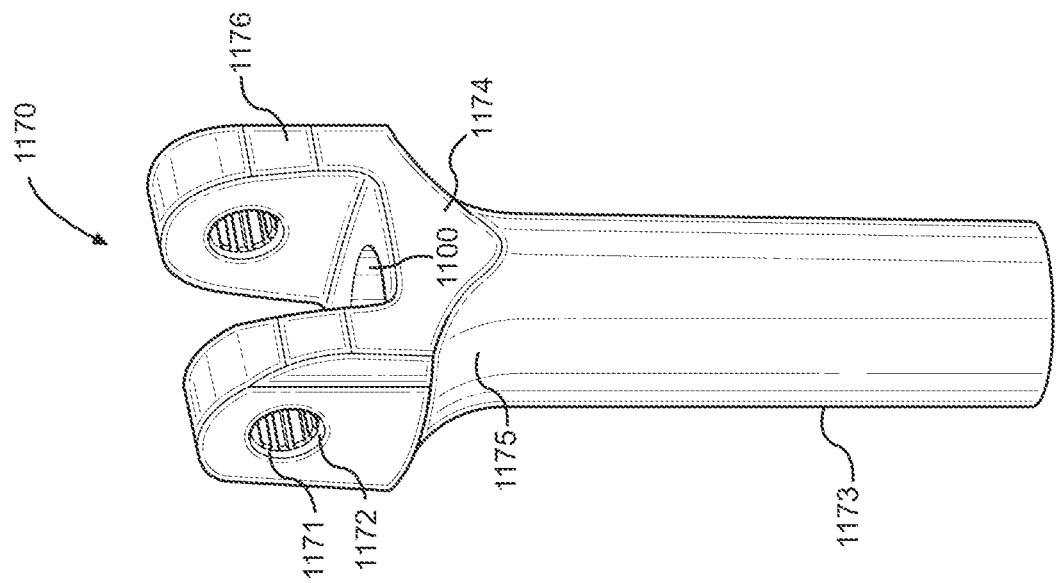
FIG. 11 depicts an isometric view of an exemplary shaft assembly, according to one or more embodiments.
Figure 10:
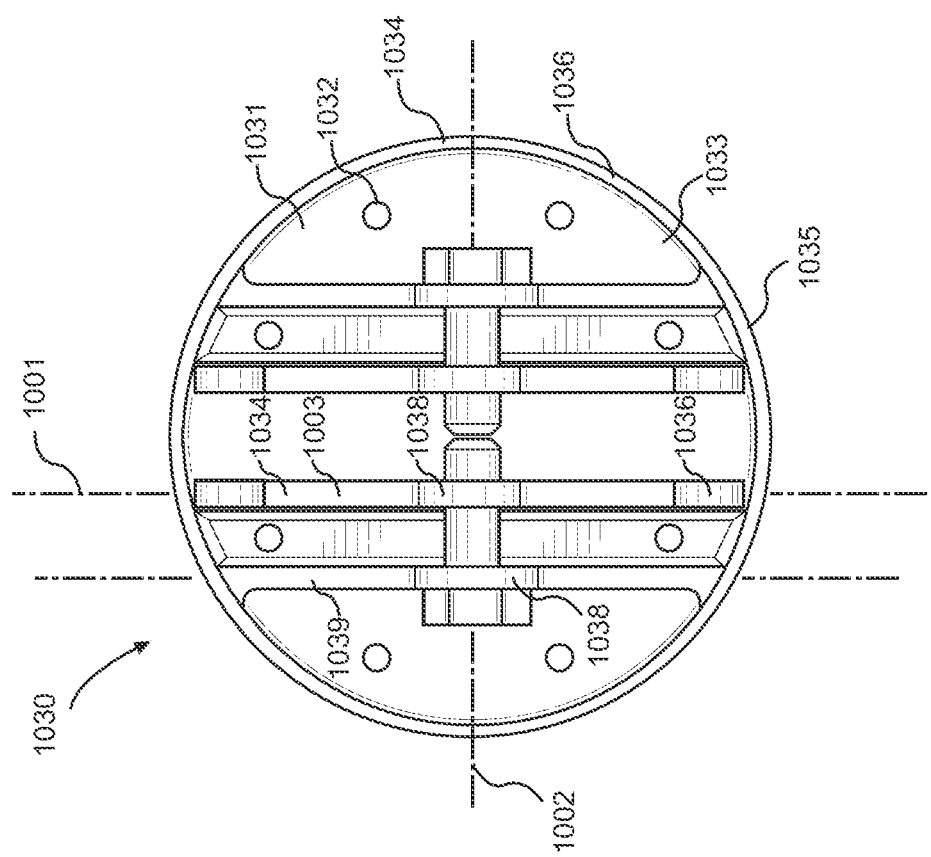
FIG. 10 depicts a bottom view of an exemplary hub, according to one or more embodiments.

Reference will now be made to FIGS. 10 and 11 to describe how some components of exemplary rotor assemblies according to the present disclosure may advantageously be changed out and/or incorporated in different rotor assembly configurations. FIG. 10 depicts a bottom view of an exemplary hub 1030, according to one or more embodiments. The hub 1030 of FIG. 10 may be substantially similar to the hub 130 of the hub assembly 120 for the rotor assembly 100 of FIGS. 1A-4. As shown, the hub 1030 may include a first body 1031 surrounded by a second body 1034. The first body 1031 may define a plurality of through-holes 1032 and a surface 1033 from which first ribs 1034 and second ribs 1039 extend. In some examples, the first and second ribs 1034, 1039 may function to stiffen the hub 1030.

Staying with FIG. 10, each of the first and second ribs 1034, 1039 may extend along a respective longitudinal axis. As can be seen with a longitudinal axis 1001 identified in FIG. 10 for one of the first ribs 1034, a pair of first extensions 1036 extending from the first rib 1034 may be disposed at opposite ends of the first rib 1034 along the first longitudinal axis 1001. In some examples, locations of the first extensions 1036 may be configured in accordance with a diameter of a gimbal, such as the gimbal 150 illustrated in FIG. 2A, lengths of linkages, such as the first and second linkages 160A, 160B, or a combination thereof. Thus, the first extensions 1036 are not required to be disposed at opposing longitudinal extents of respective first ribs 1034. In some examples, centers of the first extensions 1036 may be in alignment with a midpoint 1003 between a respective end of the first rib 1034 and a respective edge of a second extension 1038 of the same first rib 1034. In other examples, the first extensions 1036 may be located in other locations.

In some examples, the first extensions 1036 may be located on the hub 1030 such that rotor assemblies having different first couplings between respective hubs and actuators may incorporate the same hub 1030. As will be explained with reference to FIGS. 12, 13A, and 13B, in some examples, a first coupling between a hub and an actuator may include a control rod, a coupling arm, and a coupling link, with the coupling link being secured to a first extension of the hub. Exemplary hubs of the present disclosure may be configured such that locations of first extensions for a given hub enable incorporation of the hub into of these rotor assembly configurations.

As shown, each first rib 1034 may include a second extension 1038 extending from rib 1034 and disposed between two first extensions 1036. Each of the second ribs 1039 may include a second extension 1038 extending from the second rib 1039 in a location corresponding to a location of a corresponding second extension 1038 extending from a first rib 1034. In one example, each pair of adjacent (or opposing) second extensions 1038—one second extension 1038 extending from a respective first rib 1034 and another second extension 1038 extending from a respective second rib 1039 that is adjacent to the respective first rib 1034—may define a pair of through-holes aligned along a second axis 1002. The second axis 1002 defining an axis about which the hub 1030, and a rotor blade (e.g., blade pair) attached thereto, may rotate to change a pitch of the rotor blade. The pairs of second extensions 1038 may be spaced such that each pair is configured to receive a respective arm of a rotor shaft assembly, such as a shaft arm 1176 of a shaft assembly 1170 depicted in FIG. 11, for example. Furthermore, each pair of second extensions 1038 may be configured to receive a first fastener configured to secure the hub 1030 to a shaft assembly.

While groups of two ribs are illustrated in FIG. 10, a person of ordinary skill in the art would understand that groups of other numbers of ribs are envisioned. In addition, while the shaft includes a pair of arms, a person of ordinary skill in the art would understand that other configurations are envisioned, for example a single arm or more than two arms.

FIG. 11 depicts an isometric view of an exemplary shaft assembly 1170, according to one or more embodiments. In some examples, the shaft assembly 1170 may be substantially similar to the shaft assembly 170 of the rotor assembly 100 of FIGS. 1A-5C. Accordingly, the shaft assembly of FIG. 11 may include a proximal body 1173, a transition 1175 extending between the proximal body 1173 and a head 1174 of the shaft assembly 1170. The second head 1174 may include a pair of shaft arms 1176, each shaft arm 1176 defining a third aperture 1172 configured to receive a bearing 1171. In addition to the features described immediately above, the proximal body 1173 may define therein a bore (not shown) that is continued through the head 1174 and defines an opening 1100 as shown in FIG. 11. In some examples, incorporation of a channel forming bore may enable use of the same shaft assembly for: (1) rotor assemblies having a first coupling that includes a gimbal and linkages, as with the rotor assembly 100 of FIGS. 1A-4; and (2) rotor assemblies including a control rod as part of a first coupling between a hub and an actuator, such as, for example, a rotor assembly 1300 including a control rod discussed below with reference to FIGS. 13A and 13B.

Exemplary Rotor Assemblies

Figure 12:
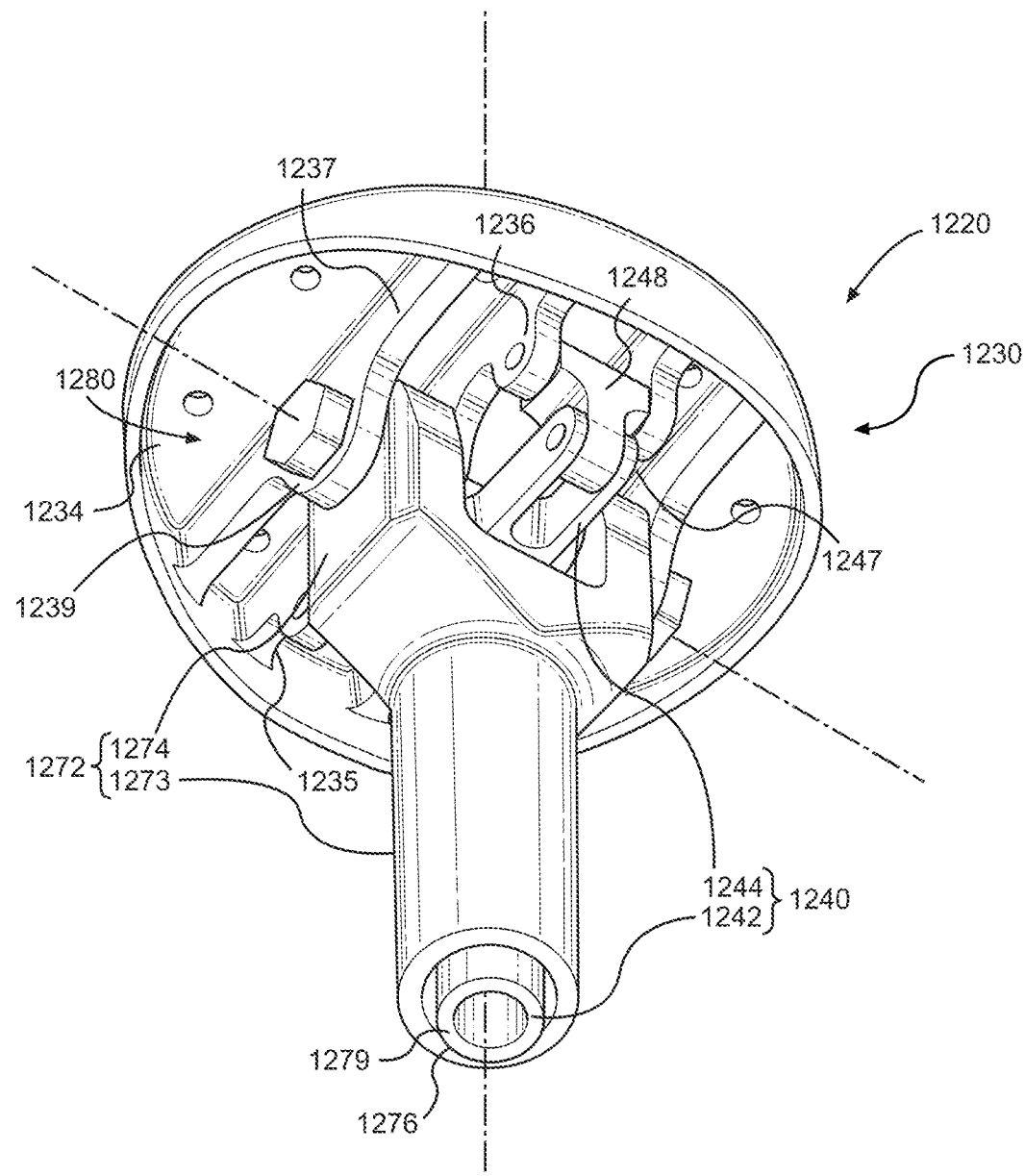
FIG. 12 depicts a bottom isometric view of an exemplary hub assembly, according to one or more embodiments.

FIG. 12 depicts a bottom isometric view of an exemplary hub assembly 1220, according to one or more embodiments.

As shown, the hub assembly 1220 includes a hub 1230 and a rotor shaft assembly 1270. The rotor shaft assembly 1270 being substantially similar to other shaft assemblies described herein and may include a shaft 1272 configure to rotate about a first axis of rotation 1201. The shaft 1272 may provide part of a second coupling 1280. More specifically, the second coupling 1280 includes, among other like components described herein and included in the hub assembly 1230, apertures defined by shaft arms 1276 and second extensions 1239 of the hub 130, and one or more assembly fasteners 1222. In one example, the second extensions 1239 may protrude from first ribs 1235 and second ribs 1237 formed on a surface 1234 of the hub 1230.

Figure 13:
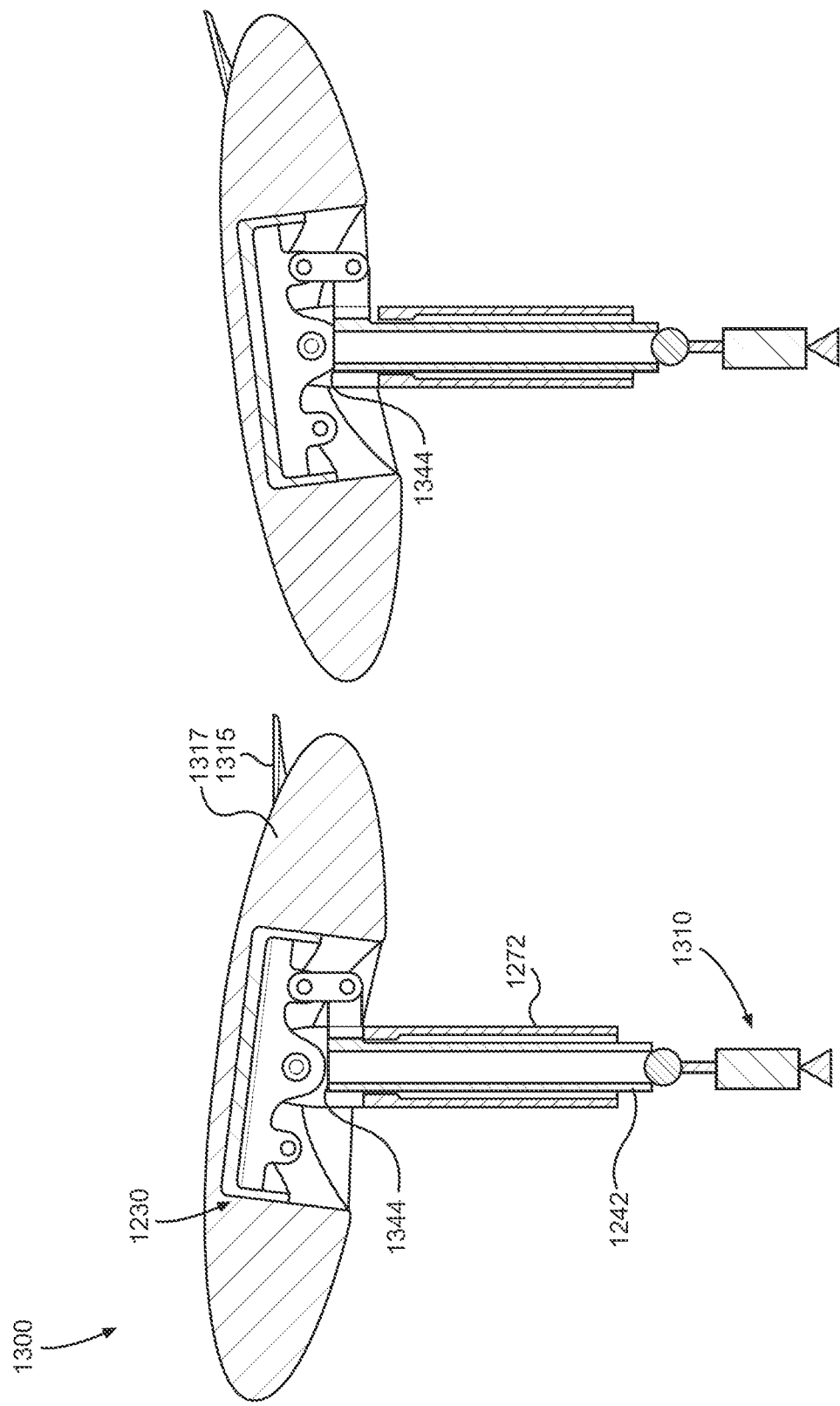
FIGS. 13A and 13B depict a cross-sectional view of a rotor assembly including the hub assembly of FIG. 12 in first and second positions, according to one or more embodiments.

In one example, a cyclic pitch of a rotor blade 1315 (see FIGS. 13A and 13B) may be controlled by pivoting or tilting of the hub 1230 about a second axis of rotation 1202 using a first coupling 1240 between the hub 1230 and an actuator (see FIGS. 13A and 13B for schematic representation of an actuator 1310). In one example, the first coupling 1240 may include a control rod 1242 disposed within a channel 1279 defined by an inner surface 1276 provided by a proximal body 1273 and a head 1274 of a shaft 1272 of the shaft assembly 1270. The control rod 1242 may be disposed coaxially relative to the shaft 1272 and thereby be coaxial relative to first axis of rotation 1201 for the shaft assembly 1270, hub assembly 1220, and rotor blade 1315 (e.g., blade pair). In one example, the first coupling 1240 may include a coupling arm 1244 extending radially from an upper end 1344 (see FIG. 13A) of the control rod 1242. A coupling link 1248 may be pivotally coupled to the surface 1234 of the hub 1230, via second extensions 1236 extending from first ribs 1235, and a free end 1247 of the coupling arm 1244. While the control rod 1242 is illustrated in FIG. 12 as a cylindrical pipe-like structure, a person of ordinary skill in the art would understand that other known shapes (e.g., square, oval) are envisioned.

FIGS. 13A and 13B depict cross-sectional views of a rotor assembly 1300 including the hub assembly 1220 of FIG. 12 in first and second positions, according to one or more embodiments. During operation, the control rod 1242 may be axially translated within the shaft 1272 by an actuator 1310. In some examples, the control rod 1242 may be translated up and down within the shaft by axially oscillating the control rod 1242 at a frequency corresponding to a rotational speed (RPM) of the rotor blade 1315 and a hub receiver 1317.

In FIG. 13A, the control rod 1242 is disposed in a first position such that the hub 1230 and rotor blade 1315 are tilted in one direction. In particular, the hub 1230 is tilted in a clockwise direction from a home position in which a surface 1234 of the hub 1230 would not be disposed at an angle. In FIG. 13B, the control rod 1242 is disposed in a second position such that the upper end 1344 of the control rod 1242 is positioned closer to the hub 1230 and the second coupling 1280 than in the first position illustrated in FIG. 13A. As a result of this positioning of the control rod 1242, the hub 1230, and rotor blade 1315 including the hub receiver 1317 are tilted in a counterclockwise direction from the home position. In some examples, a degree of axial translation of the control rod 1242 within the shaft 1272 may correspond to and define a degree of tilt of the rotor blade 1315 in both directions depicted in FIGS. 13A and 13B.

FIGS. 14A and 14B depict cross-section views of a rotor assembly 1400, according to one or more embodiments. FIG. 14A and FIG. 14B have the same relative relationship as that of FIG. 2A and FIG. 2B, which is depicted in FIG. 1C. As shown in FIG. 14A, the rotor assembly 1400 may include a rotor blade 1415 (e.g., blade pair) coupled to a hub assembly 1420, and a shaft assembly 1470 coupled to a hub 1430 of the hub assembly 1420. In one example, the hub assembly 1420 may be disposed in a hub receiver 1417 of the rotor blade 1415. The hub assembly 1420 may include a first coupling 1440 between the hub 1430 and an actuator 1410. The first coupling 1440 may include a bearing assembly 1442 installed in the hub 1430 and a bearing extension 1445 configured to couple the bearing assembly 1442 to an actuator arm 1412. The actuator arm 1412 may extend between the bearing assembly 1442 and an actuator 1410. The actuator 1410 may be mounted proximate to the shaft assembly 1470 and provide a point of attachment between the hub 1430 and a structure of a vehicle (not shown), such as an AMV.

In some examples, the rotor assembly 1400 may be configured to accommodate axial movements of the actuator 1410 with a change in pitch of the rotor blade 1415 coupled to the hub 1430. In one or more examples, the rotor blade 1415 may be coupled to the hub 1430 via a third coupling as described herein for other exemplary rotor assemblies. In some examples, the actuator 1410 may be a linear or rotary actuator. Furthermore, the rotor assembly 1400 may be configured such that movement of the actuator 1410 affects a pitch of rotor blade 1415 in a fixed reference frame. In some examples, the bearing assembly 1442 may be configured to be affected by the actuator 1410 to transmit movement of the actuator 1410 to the hub 1430 and change the pitch of the rotor blade 1415.

In one or more examples, the bearing assembly 1442 may be concentric with a first axis of rotation 1401 for the shaft 1472 and rotor blade 1415. Furthermore, the bearing assembly 1442 may be disposed proximate to the first axis of rotation axis 1401 and configured to provide a short, stiff load path for the hub 1430 to be acted on by the actuator 1410. In some examples, the actuator 1410 may be coupled to a non-rotating inner ring 1446 of the bearing assembly 1442. An outer race 1448 of the bearing assembly 1442 may be mounted inside the rotor blade 1415 and/or the hub 1430. In other examples, the bearing assembly 1442 may include two bearings, each positioned on either side of the rotor shaft assembly 1470. In some examples, the bearing assembly 1442 may be provided as a duplex bearing. In still other examples, the bearing assembly 1442 may be such so to be characterized as a contact bearing. Vibration may be reduced or eliminated through use of the bearing assembly 1442. The actuator 1410 may be a low bandwidth monocyclic actuator.

As shown in FIG. 14B, fastener 1468 may be configured to secure the hub 1430 to the shaft assembly 1470. In particular, the fasteners 1468 may be mounted on bearings 1474 of the shaft assembly 1470. In other examples, a single fastener defining a shaft-like body may be mounted on the bearings 1474. The bearings 1474 may be positioned in apertures defined by extensions 1438 of the hub 1430 and through which the fastener 1468 may extend coaxially with a second axis of rotation 1402. The hub 1430 may rotate about the second axis of rotation 1402 with movement of the actuator arm 1412, as transmitted by the bearing assembly 1442, and thereby change the pitch of the rotor blade 1415.

Figure 15:
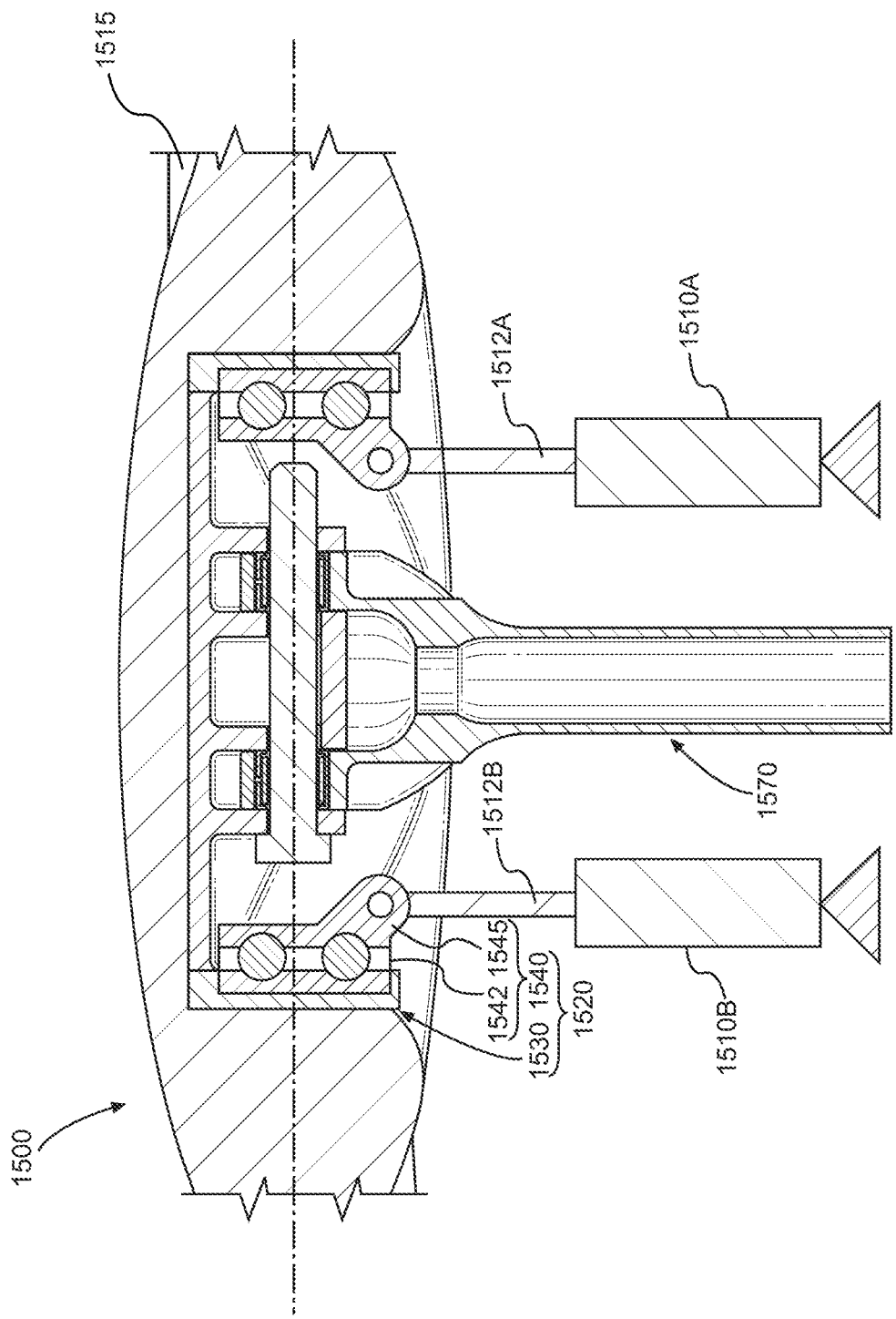
FIG. 15 depicts a rotated cross-sectional cut view of a rotor assembly, according to one or more embodiments.

FIG. 15 depicts a rotated cross-sectional cut view of a rotor assembly 1500, according to one or more embodiments. More specifically, a portion of FIG. 15 to the right of an axis 1501 may represent a view of a first plane, and a portion of FIG. 15 to the left of axis 1501 may represent a view of a second plane rotated 90° out of a page from the first plane about the axis 1501. The rotor assembly 1500 of FIG. 15 may include multiple actuators disposed in orthogonal planes. More specifically, the rotor assembly 1500 includes a rotor blade 1515 coupled to a hub assembly 1520, and a shaft assembly 1570 coupled to a hub 1530 of the hub assembly 1520. In one example, the hub assembly 1520 may include first couplings 1540 between the hub 1530 and the first and second actuators 1510A, 1510B that includes a bearing assembly 1542 installed in the hub 1530 and bearing extensions 1545 coupled to first and second actuator arms 1512A, 1512B. In another example, the rotor assembly 1500 may include a second coupling 1580 between the hub assembly 1520 and the shaft assembly 1570 that may include a gimbal such that the hub assembly 1520 may be configured to pivot about multiple axes.

Each of the first and second actuator arms 1512A, 1512B may respectively extend between the bearing assembly 1542 and the first and second actuators 1510A, 1510B within a respective plane in which that actuator is disposed. The first and second actuators 1510A, 1510B may be mounted proximate to the shaft assembly 1570 and provide a point of attachment between the hub 1530 and a structure of a vehicle (not shown), such as an AMV. One of ordinary skill in the art will recognize that the first actuator 1510A lies in a plane that is orthogonal to a plane including the second actuator 1510B.

Figure 14:
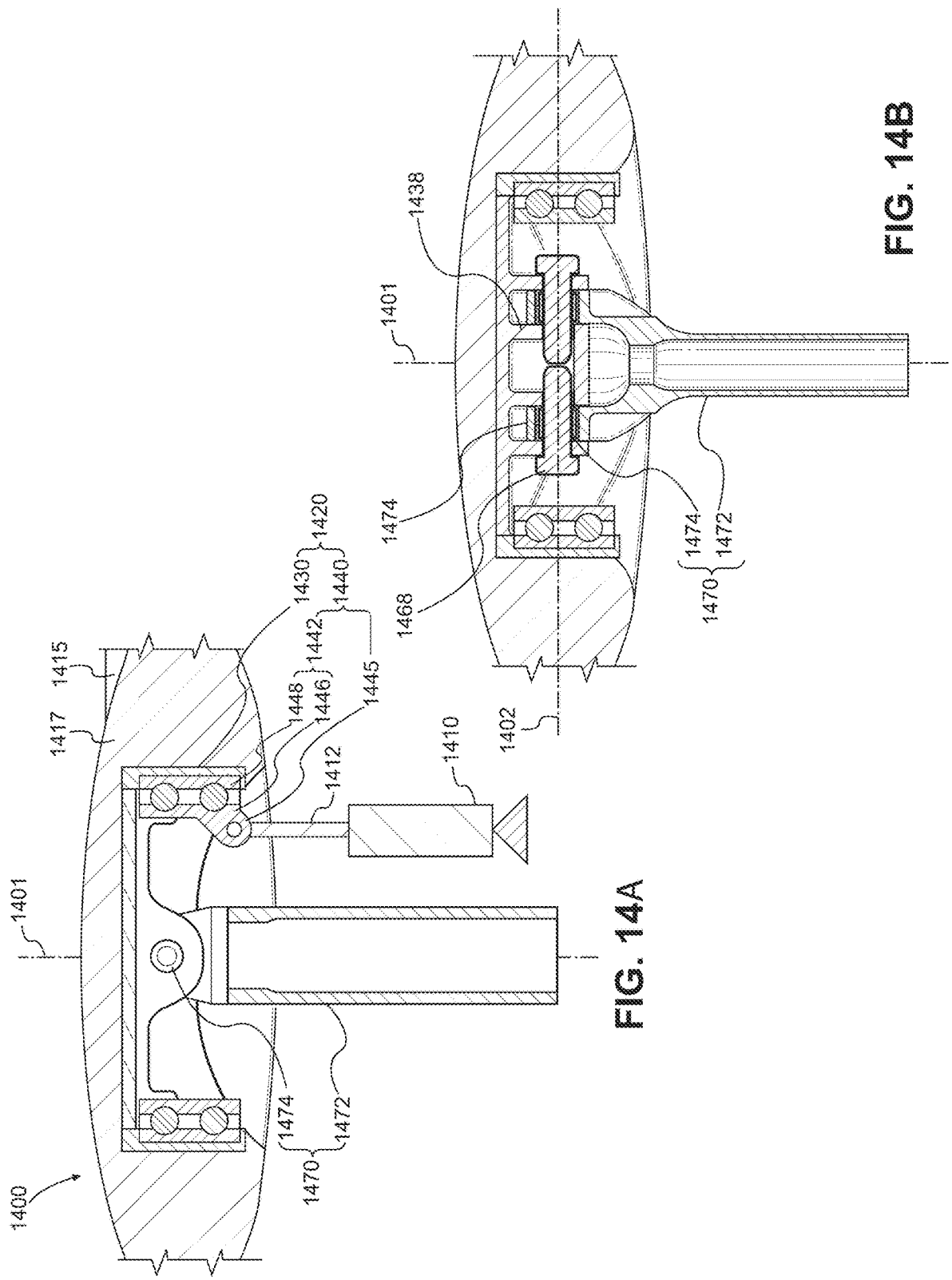
FIG. 14A depicts a cross-sectional view of a rotor assembly, according to one or more embodiments.
FIG. 14B depicts another cross-sectional view of the rotor assembly of FIG. 14A.

In both the rotor assemblies 1400, 1500 of FIGS. 14 and 15, a rotor blade may be two-bladed rotor, and the pitch of both blades may be changed cyclically in equal and opposite directions with one or more actuators grounded in a fixed reference frame and connected directly to a non-rotating, inner ring of an bearing assembly. Furthermore, in both rotor assemblies 1400, 1500, a rotating outer race of a bearing assembly may be integrally mounted inside a structure of the rotor blade. In some examples, the rotor blade may be provided as a monolithic structure including two blades extending from a hub receiver configured to be coupled a hub assembly that includes the bearing assembly.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rotor assembly comprising:
    a hub assembly including a hub and a first coupling for coupling the hub to an actuator;
    a shaft assembly coupled to the hub assembly with a second coupling, the second coupling being configured to facilitate rotation of the hub relative to a shaft of the shaft assembly; and
    a rotor blade coupled to the hub assembly with a third coupling, the rotor blade being configured to rotate with the shaft;
    wherein the first coupling transmits movements of the actuator to the hub to facilitate cyclic pitch control of the rotor blade; and
    wherein the shaft includes arms extending from a proximal body of the shaft, wherein the hub includes a body configured to be coupled to the rotor blade by the third coupling and pairs of extensions that extend from a surface of the body, and wherein each pair of extensions is configured to receive and be coupled to a respective one of the arms.

2. The rotor assembly of claim 1, wherein the first coupling includes a gimbal, a first linkage coupling the hub to the gimbal, and a second linkage coupling the hub to the gimbal.

3. The rotor assembly of claim 2, wherein the gimbal is mounted on the shaft and configured to rotate about a third axis that is perpendicular to a first axis of rotation of the shaft, and wherein rotation of the gimbal causes the first linkage and the second linkage to rotate the hub about a second axis defined by the second coupling.

4. The rotor assembly of claim 2, wherein the gimbal includes:
    an inner race engaged to the shaft;
    an outer race disposed in a carrier that is coupled to the first linkage and the second linkage; and
    a ring positioned between the inner race and the outer race;
    wherein the inner race and the outer race are configured to rotate relative to the ring during rotation of the shaft.

5. The rotor assembly of claim 2, wherein the gimbal includes:
    an inner race engaged to the shaft;
    an outer race disposed in a carrier that is coupled to the first linkage and the second linkage; and
    a ring positioned between the inner race and the outer race; and
    a tab extending from the ring,
    wherein the tab extends from the ring and is configured to couple to the actuator that provides a fixed reference frame.

6. The rotor assembly of claim 2, wherein each of the first linkage and the second linkage is coupled to a respective pair of extensions.

7. The rotor assembly of claim 1, further comprising at least one fastener disposed in through-holes defined by the arms and the pairs of extensions, the at least one fastener extending coaxially relative to an axis of rotation of the hub for the rotation of the hub relative to the shaft.

8. The rotor assembly of claim 1, further comprising bearings disposed in through-holes defined by the arms of the shaft assembly, wherein the bearings are configured to receive at least one fastener of the second coupling, and wherein the bearings are disposed to extend coaxially relative to an axis of rotation of the hub for the rotation of the hub relative to the shaft.

9. The rotor assembly of claim 1, wherein the hub is disposed within a recess defined by a hub receiver of the rotor blade, and wherein the body of the hub defines a plurality of through-holes configured to receive fasteners of the third coupling that are configured to couple the body of the hub to an inner surface of the hub receiver that defines the recess.

10. The rotor assembly of claim 1, wherein the hub is configured to rotate relative to the shaft about an axis defined by the second coupling between approximately +15 degrees and approximately −15 degrees.

11. The rotor assembly of claim 1, wherein the first coupling includes a control rod disposed within the shaft and a link coupled to the control rod and the hub, wherein the control rod is configured to engage an actuator and move within the shaft.

12. The rotor assembly of claim 1, wherein the first coupling includes a bearing assembly positioned within the hub and a bearing extension that extends from the bearing assembly and is configured to be coupled to an actuator.

13. A rotor assembly comprising:
a hub assembly including a hub and a first coupling configured to couple the hub to a plurality of actuators;
a shaft assembly coupled to the hub assembly with a second coupling, the second coupling being configured to facilitate rotation of the hub relative to a shaft of the shaft assembly; and
a rotor blade coupled to the hub assembly with a third coupling, the rotor blade being configured to rotate with the shaft;
wherein the first coupling transmits movements of the plurality of actuators to the hub to facilitate cyclic pitch control of the rotor blade; and
wherein the shaft includes arms extending from a proximal body of the shaft, wherein the hub includes a body configured to be coupled to the rotor blade by the third coupling and pairs of extensions that extend from a surface of the body, and wherein each pair of extensions is configured to receive and be coupled to a respective one of the arms.

14. The rotor assembly of claim 13, wherein the rotor blade includes a two-bladed rotor blade.

15. The rotor assembly of claim 13, wherein the first coupling includes:
a bearing assembly;
a first bearing extension extending from the bearing assembly; and
a second bearing extension extending from the bearing assembly;
wherein the first bearing extension is configured to be coupled to a first one of the plurality of actuators; and
wherein the second bearing extension is configured to be coupled to a second one of the plurality of actuators.

16. The rotor assembly of claim 13 wherein the hub is configured to rotate relative to the shaft about an axis defined by the second coupling between approximately +15 degrees and approximately −15 degrees.

17. The rotor assembly of claim 13, wherein the first coupling includes:
a gimbal;
a first linkage coupling the hub to the gimbal;
a second linkage coupling the hub to the gimbal;
a first tab extending from the gimbal, the first tab being configured to be coupled to a first one of the plurality of actuators; and
a second tab extending from the gimbal, the second tab being configured to be coupled to a second one of the plurality of actuators.

18. A rotor assembly comprising:
a hub assembly including a hub and a first coupling configured to couple the hub to an actuator;
a shaft assembly coupled to the hub assembly with a second coupling, the second coupling being configured to facilitate rotation of the hub relative to a shaft of the shaft assembly; and
a rotor blade coupled to the hub assembly with a third coupling, the rotor blade being configured to rotate with the shaft;
wherein the shaft includes arms extending from a proximal body of the shaft;
wherein the hub includes pairs of extensions that extend from a surface of the body, each pair of extensions receiving and coupled to a respective one of the arms;
wherein the first coupling transmits movements of the actuator to the hub to facilitate cyclic pitch control of the rotor blade.

19. The rotor assembly of claim 18, wherein the rotor blade includes a two-bladed rotor blade.

* * * * *